US011229987B2

(12) United States Patent
Eckel et al.

(10) Patent No.: US 11,229,987 B2
(45) Date of Patent: Jan. 25, 2022

(54) EMBEDDED ELECTRONIC CIRCUIT IN GRINDING WHEELS AND METHODS OF EMBEDDING

(71) Applicant: 3M INNOVATIVE PROPERTIES COMPANY, St. Paul, MN (US)

(72) Inventors: Joseph B. Eckel, Vadnais Heights, MN (US); Nicholas T. Gabriel, Grand Rapids, MN (US); Ankit Mahajan, Cupertino, CA (US); Mikhail L. Pekurovsky, Bloomington, MN (US); Kara A. Meyers, Oakdale, MN (US); Thomas J. Metzler, St. Paul, MN (US); Saagar A. Shah, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/250,673

(22) PCT Filed: Aug. 15, 2019

(86) PCT No.: PCT/IB2019/056931
§ 371 (c)(1),
(2) Date: Feb. 18, 2021

(87) PCT Pub. No.: WO2020/044158
PCT Pub. Date: Mar. 5, 2020

(65) Prior Publication Data
US 2021/0178554 A1 Jun. 17, 2021

Related U.S. Application Data

(60) Provisional application No. 62/723,123, filed on Aug. 27, 2018.

(51) Int. Cl.
*B24D 7/04* (2006.01)
*B24D 7/18* (2006.01)
(Continued)

(52) U.S. Cl.
CPC .............. *B24D 7/18* (2013.01); *B24D 3/001* (2013.01); *B24D 5/04* (2013.01); *B24D 7/04* (2013.01);
(Continued)

(58) Field of Classification Search
CPC . B24D 3/001; B24D 5/02; B24D 5/04; B24D 5/12; B24D 7/02; B24D 7/04;
(Continued)

(56) References Cited

U.S. PATENT DOCUMENTS 4,314,827 A 2/1982 Leitheiser
4,623,364 A 11/1986 Cottringer
(Continued)

FOREIGN PATENT DOCUMENTS

EP 1975985 10/2008
JP 2011-218487 11/2011
(Continued)

OTHER PUBLICATIONS

Barbee, "Microstructure of Amorphous 304 Stainless Steel-Carbon Alloys Synthesized by Magnetron Sputter Deposition," Thin Solid Films, 1979, vol. 63, pp. 143-150.
(Continued)

*Primary Examiner* — Eileen P Morgan
(74) *Attorney, Agent, or Firm* — Katherine M. Scholz

(57) ABSTRACT

A bonded abrasive wheel is disclosed comprising a plurality of abrasive particles disposed in a binder, a first grinding surface, a second surface opposing the first grinding surface, and an outer circumference. The wheel comprises a rotational axis extending through a central hub and a circuit
(Continued)

configured as a Radio Frequency Identification (RFID) unit coupled to the abrasive wheel. The circuit comprises an antenna configured to communicate with one or more external devices and comprising a first end and a second end, wherein antenna has a radius of curvature about an axis along at least a portion thereof such that the first end is disposed adjacent to but is spaced from the second end, and an integrated circuit (IC) operably coupled to the antenna and configured to store at least a first data.

4 Claims, 10 Drawing Sheets

(51) Int. Cl.
*B24D 5/04* (2006.01)
*B24D 3/00* (2006.01)
*B24D 18/00* (2006.01)
*G06K 19/04* (2006.01)
*G06K 19/07* (2006.01)

(52) U.S. Cl.
CPC ..... *B24D 18/0009* (2013.01); *B24D 18/0054* (2013.01); *B24D 18/0081* (2013.01); *G06K 19/045* (2013.01); *G06K 19/0723* (2013.01)

(58) Field of Classification Search
CPC .. B24D 7/18; B24D 18/0009; B24D 18/0027; B24D 18/0054; B24D 18/0081; B24D 18/008; G06K 19/045; G06K 19/0723
USPC ................ 451/5, 8, 178, 259, 541, 546, 548
See application file for complete search history.

(56) References Cited

U.S. PATENT DOCUMENTS

| | | | |
|---|---|---|---|
| 4,744,802 A | 5/1988 | Schwabel | |
| 4,770,671 A | 9/1988 | Monroe | |
| 4,881,951 A | 11/1989 | Wood | |
| 5,152,917 A | 10/1992 | Pieper | |
| 5,201,916 A | 4/1993 | Berg | |
| 5,202,680 A * | 4/1993 | Savage | E21B 47/13 340/853.1 |
| 5,213,591 A | 5/1993 | Celikkaya | |
| 5,366,523 A | 11/1994 | Rowenhorst | |
| 5,435,816 A | 7/1995 | Spurgeon | |
| RE35,570 E | 7/1997 | Rowenhorst | |
| 5,672,097 A | 9/1997 | Hoopman | |
| 5,766,277 A | 6/1998 | DeVoe | |
| 5,946,991 A | 9/1999 | Hoopman | |
| 5,975,987 A | 11/1999 | Hoopman | |
| 5,984,988 A | 11/1999 | Berg | |
| 6,129,540 A | 10/2000 | Hoopman | |
| 7,431,682 B2 * | 10/2008 | Zeiler | B23B 45/00 483/9 |
| 7,727,931 B2 | 6/2010 | Brey | |
| 7,740,425 B2 * | 6/2010 | Zeiler | B23D 61/025 408/9 |
| 7,817,098 B2 * | 10/2010 | Gertz | G06K 7/0008 343/842 |
| 7,914,363 B2 | 3/2011 | Yilmaz | |
| 8,034,137 B2 | 10/2011 | Erickson | |
| 8,142,531 B2 | 3/2012 | Adefris | |
| 8,142,532 B2 | 3/2012 | Erickson | |
| 8,142,891 B2 | 3/2012 | Culler | |
| 8,698,394 B2 | 4/2014 | McCutcheon | |
| 9,061,392 B2 * | 6/2015 | Forgues | B24B 55/00 |
| 9,669,508 B2 * | 6/2017 | Layton, Jr. | B24B 41/06 |
| 10,295,990 B2 * | 5/2019 | Dey, IV | G05B 19/4155 |
| 10,300,574 B2 * | 5/2019 | Layton, Jr. | B24B 55/00 |
| 10,380,883 B2 * | 8/2019 | Matson | H04L 67/306 |
| 10,832,018 B2 * | 11/2020 | Koike | B41J 3/4075 |
| 2006/0014475 A1 * | 1/2006 | Sekiya | B24D 7/06 451/5 |
| 2006/0159533 A1 * | 7/2006 | Zeiler | B23B 51/02 408/226 |
| 2008/0004743 A1 * | 1/2008 | Goers | B24B 53/017 700/121 |
| 2008/0302549 A1 * | 12/2008 | Zeiler | B23B 45/00 173/46 |
| 2009/0165394 A1 | 7/2009 | Culler | |
| 2009/0169816 A1 | 7/2009 | Erickson | |
| 2010/0096455 A1 * | 4/2010 | Binmore | G06K 7/0008 235/439 |
| 2012/0227333 A1 | 9/2012 | Adefris | |
| 2013/0040537 A1 | 2/2013 | Schwabel | |
| 2013/0125477 A1 | 5/2013 | Adefris | |
| 2016/0114454 A1 | 4/2016 | Layton, Jr. | |
| 2018/0068214 A1 | 3/2018 | Jesme | |
| 2020/0039027 A1 * | 2/2020 | Goulet | B24D 7/04 |

FOREIGN PATENT DOCUMENTS

| | | |
|---|---|---|
| WO | WO 2006-066259 | 6/2006 |
| WO | WO 2016-160359 | 10/2016 |
| WO | WO 2018-080704 | 5/2018 |
| WO | WO 2018-160658 | 9/2018 |

OTHER PUBLICATIONS

International Search Report for PCT International Application No. PCT/IB2019/056931, dated Jan. 14, 2020, 5 pages.

* cited by examiner

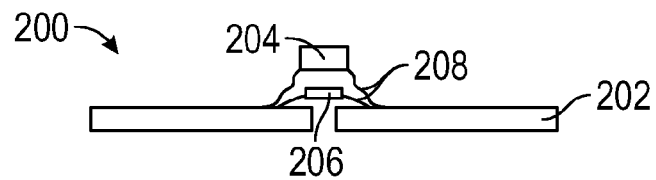
FIG. 2A
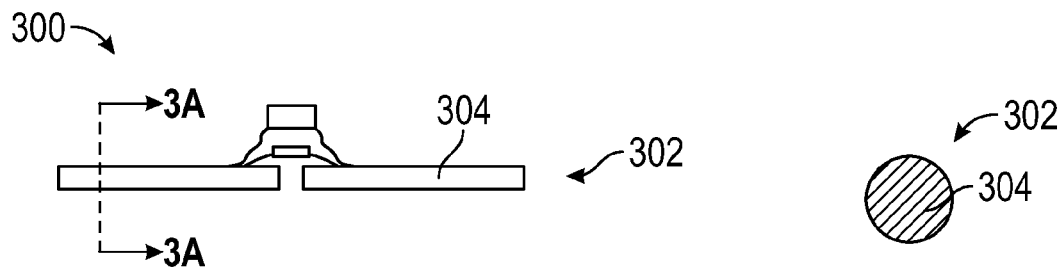
FIG. 3
FIG. 3A
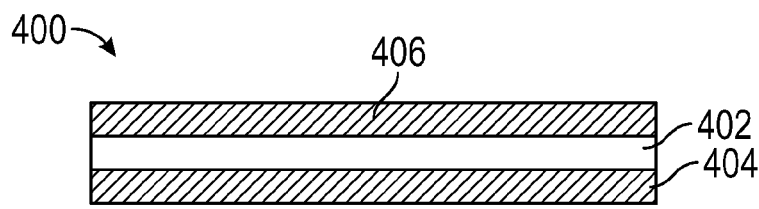
FIG. 4
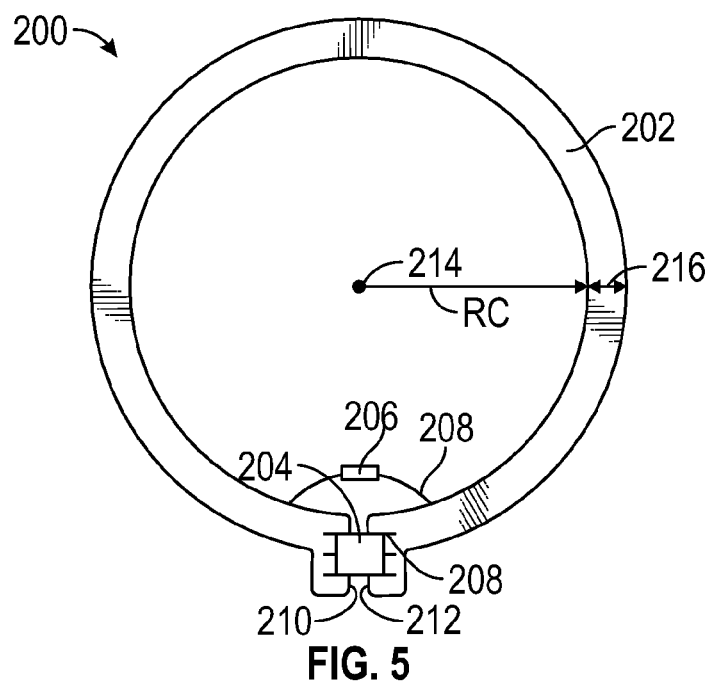
FIG. 5

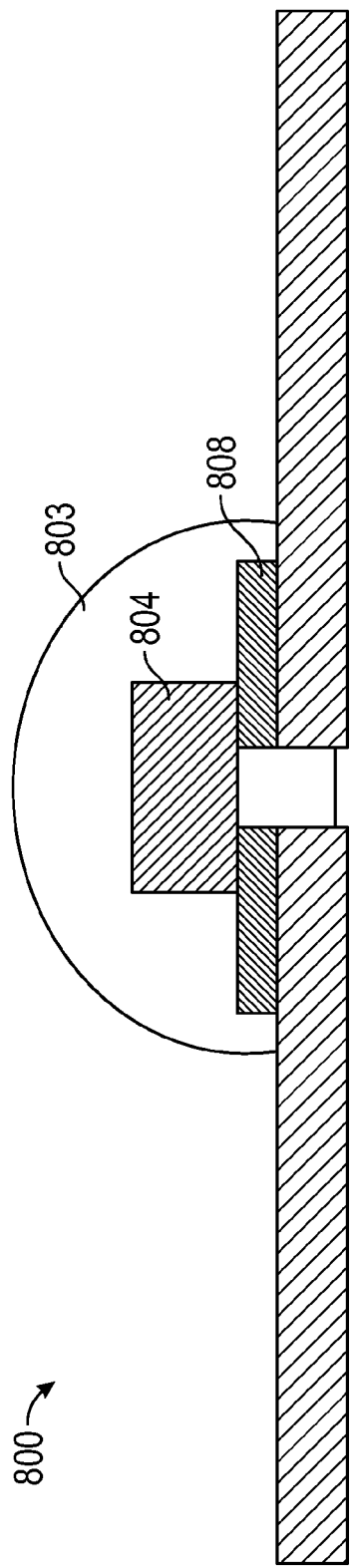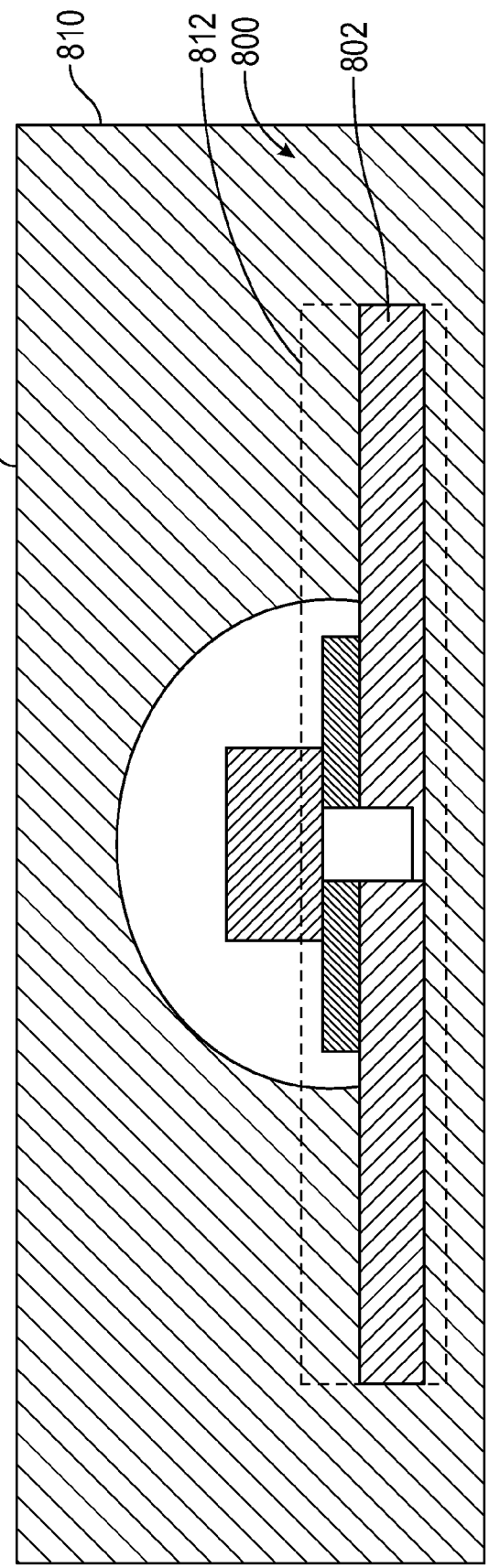

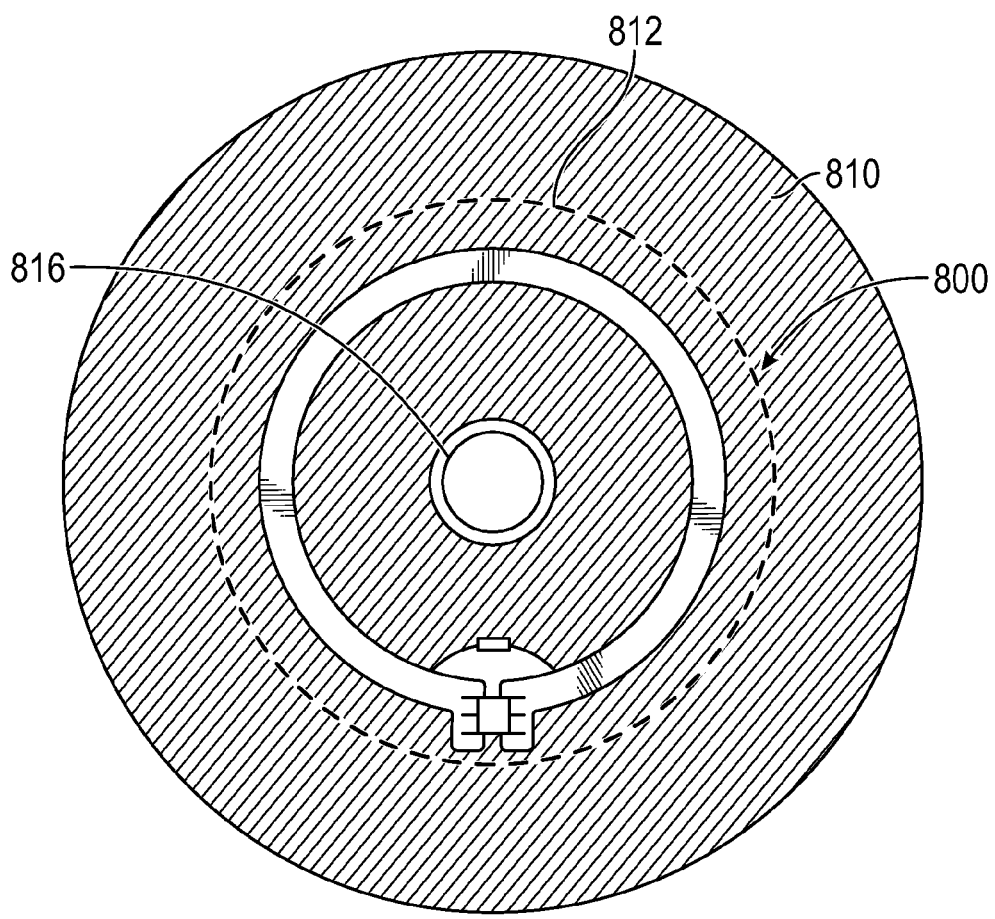
FIG. 8C
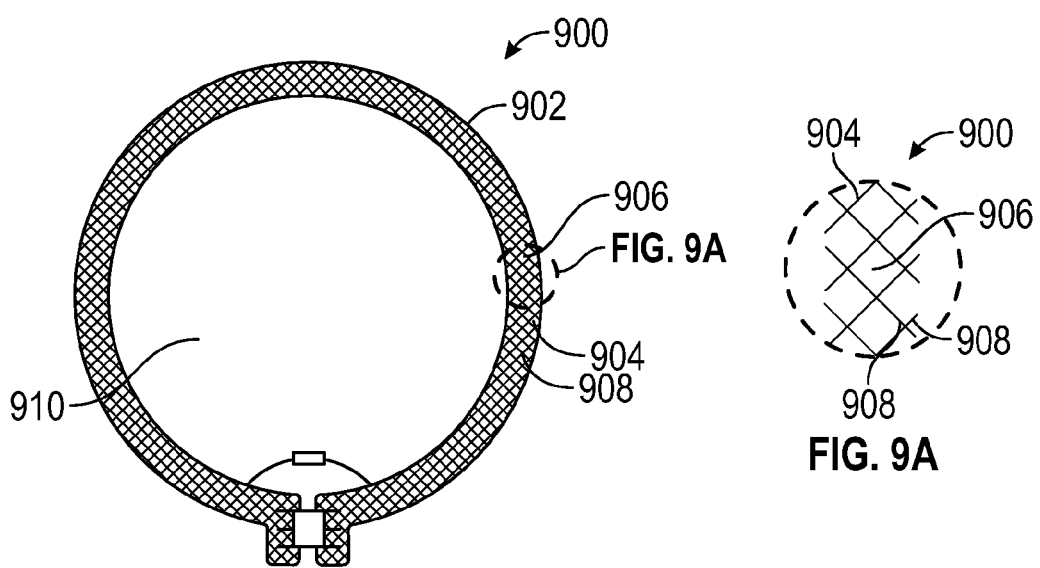
FIG. 9
FIG. 9A

EMBEDDED ELECTRONIC CIRCUIT IN GRINDING WHEELS AND METHODS OF EMBEDDING

CROSS REFERENCE TO RELATED APPLICATIONS

This application is a national stage filing under 35 U.S.C. 371 of PCT/IB2019/056931, filed Aug. 15, 2019, which claims the benefit of U.S. Provisional Application No. 62/723,123, filed Aug. 27, 2018, the disclosure of which is incorporated by reference in its/their entirety herein.

TECHNICAL FIELD

This disclosure relates to consumable abrasive products, and more particularly, to consumable abrasive products having an electronic circuit embedded therein.

BACKGROUND

Abrading tools and associated consumable abrasive products are used in numerous industries. For example, consumable abrasive products are used in the woodworking industries, marine industries, automotive industries, construction industries, and so on. Consumable abrasive products can include bonded abrasive wheels such as cut-off wheels and grinding wheels that are used for physically abrading workpieces. Bonded abrasive wheels are typically in the shape of a circular wheel and are arranged around a central hub. Bonded abrasive wheels include abrasive particles such as rods bonded together by a bonding medium (i.e., a binder). The bonding medium may be an organic resin (e.g., resin bond wheels), but may also be an inorganic material such as a ceramic or glass (i.e., vitreous bond wheels).

Consumable abrasive products are consumable in the sense that they can be consumed and replaced much more frequently than the abrading tools with which they are used. For instance, a grinding wheel for an angle grinder can only last for a few days of work before needing to be replaced, but the angle grinder itself can last many years.

SUMMARY

This disclosure describes apparatuses, techniques and methods for embedding electronic circuitry within bonded abrasive wheels. Such circuitry can comprise Radio Frequency Identification (RFID) circuitry, Near Field Communication (NFC) circuitry, or another type of circuitry that be used for communication, for example. Also disclosed herein are systems and techniques related to communication equipped abrading tools, consumable abrasive products (here a bonded grinding wheel), workpieces, and/or operating devices (e.g., robotic devices). As described herein, communication among components of the system (e.g., the abrading tool(s), the grinding wheel(s), workpiece(s), operating devices, etc.) and potentially one or more other computing systems can provide/utilize data that can be used enhance safety, quality, asset security, regulatory compliance, and inventory management.

In one example, a bonded abrasive wheel is disclosed. The bonded abrasive wheel can optionally comprise: a plurality of abrasive particles disposed in a binder; a first grinding surface; a second surface opposing the first grinding surface; an outer circumference; a rotational axis extending through a central hub; and a circuit configured as a Radio Frequency Identification (RFID) unit coupled to the abrasive wheel, wherein the circuit optionally can comprise: an antenna configured to communicate with one or more external devices and comprising a first end and a second end, wherein antenna has a radius of curvature about an axis along at least a portion thereof such that the first end is disposed adjacent to but is spaced from the second end, and an integrated circuit (IC) operably coupled to the antenna and configured to store at least a first data.

In another example, a bonded abrasive wheel is disclosed. The bonded abrasive wheel can optionally comprise: a plurality of abrasive particles disposed in a binder; a first grinding surface; an outer circumference; a rotational axis extending through a central hub; and a circuit configured as a Radio Frequency Identification (RFID) unit coupled to the bonded abrasive wheel, wherein the circuit can optionally comprise: an antenna embedded within the bonded abrasive wheel; and an integrated circuit (IC) operably coupled to the antenna, wherein the integrated circuit is encapsulated within a material having a modulus of greater than 0.25 MPa but less than 125 GPa.

In yet another example, a bonded abrasive wheel is disclosed. The bonded abrasive wheel can optionally comprise: a plurality of abrasive particles disposed in a binder; a first grinding surface; an outer circumference; a rotational axis extending through a central hub; and a circuit configured for communication coupled to the bonded abrasive wheel, wherein the circuit can optionally comprise: an antenna embedded within the bonded abrasive wheel, the antenna comprising a mesh having a plurality of openings, each of the plurality of openings being defined between a plurality of strands of the mesh, and wherein, in cross-section, wherein a total area of all of the plurality of openings is between 5 times and 20 times smaller than a central opening defined by the antenna having the radius of curvature; and an integrated circuit (IC) operably coupled to the antenna.

In yet a further example, a method of making a bonded abrasive wheel is disclosed. The method can optionally comprise the steps of: positioning a first layer of a first curable composition into a mold having a circular mold cavity with a central portion configured to create a central hub, wherein the circular mold cavity has an outer circumference, and wherein the first curable composition comprises abrasive particles dispersed in a binder precursor; forming a least a first recess in the first layer of the first curable composition; positioning a circuit within the mold on the first layer of the first curable composition, wherein the positioning includes positioning an integrated circuit (IC) of the circuit within the at least first recess; positioning a second layer of first curable composition into the mold on the first layer and the circuit such that the circuit is positioned between the first layer and the second layer; and at least partially curing the first curable composition to provide the bonded abrasive wheel.

Features and advantages of the present disclosure will be further understood upon consideration of the detailed description as well as the appended claims.

The details of one or more examples of the disclosure are set forth in the accompanying drawings and the description below. Other features, objects, and advantages of the disclosure will be apparent from the description, drawings, and claims.

BRIEF DESCRIPTION OF DRAWINGS

FIG. 2A is a side schematic cross-sectional view of the circuit of FIG. 2.

FIG. 3 is a side schematic cross-sectional view of another example of a circuit having a wire antenna, in accordance with one example of the present application.

FIG. 3A is a cross-section of the wire antenna of FIG. 3.

FIG. 4 is an enlarged view of a portion of an antenna having a first backing and a second backing, in accordance with one example of the present application.

FIG. 5 is a schematic view of the circuit of FIG. 2 illustrating a width of an antenna, in accordance with one example of the present application.

FIG. 8A is side schematic cross-sectional view of another example circuit that can be used within the bonded abrasive wheel that includes encapsulation of an integrated circuit, in accordance with one example of the present application.

FIG. 8B is a side schematic cross-sectional view of the circuit of FIG. 8A embedded within the bonded abrasive wheel and showing a region around the antenna that can utilize a different type of abrasive particle or a filler, in accordance with one example of the present application.

FIG. 8C is a top schematic cross-sectional view of the circuit and the bonded abrasive wheel of FIG. 8B.

FIG. 9 is a top schematic cross-sectional view of another example of a circuit utilizing a mesh antenna and a bonded abrasive wheel, in accordance with one example of the present application.

FIG. 9A is an enlarged view of a portion of the mesh antenna of FIG. 9.

DETAILED DESCRIPTION

Figure 1:
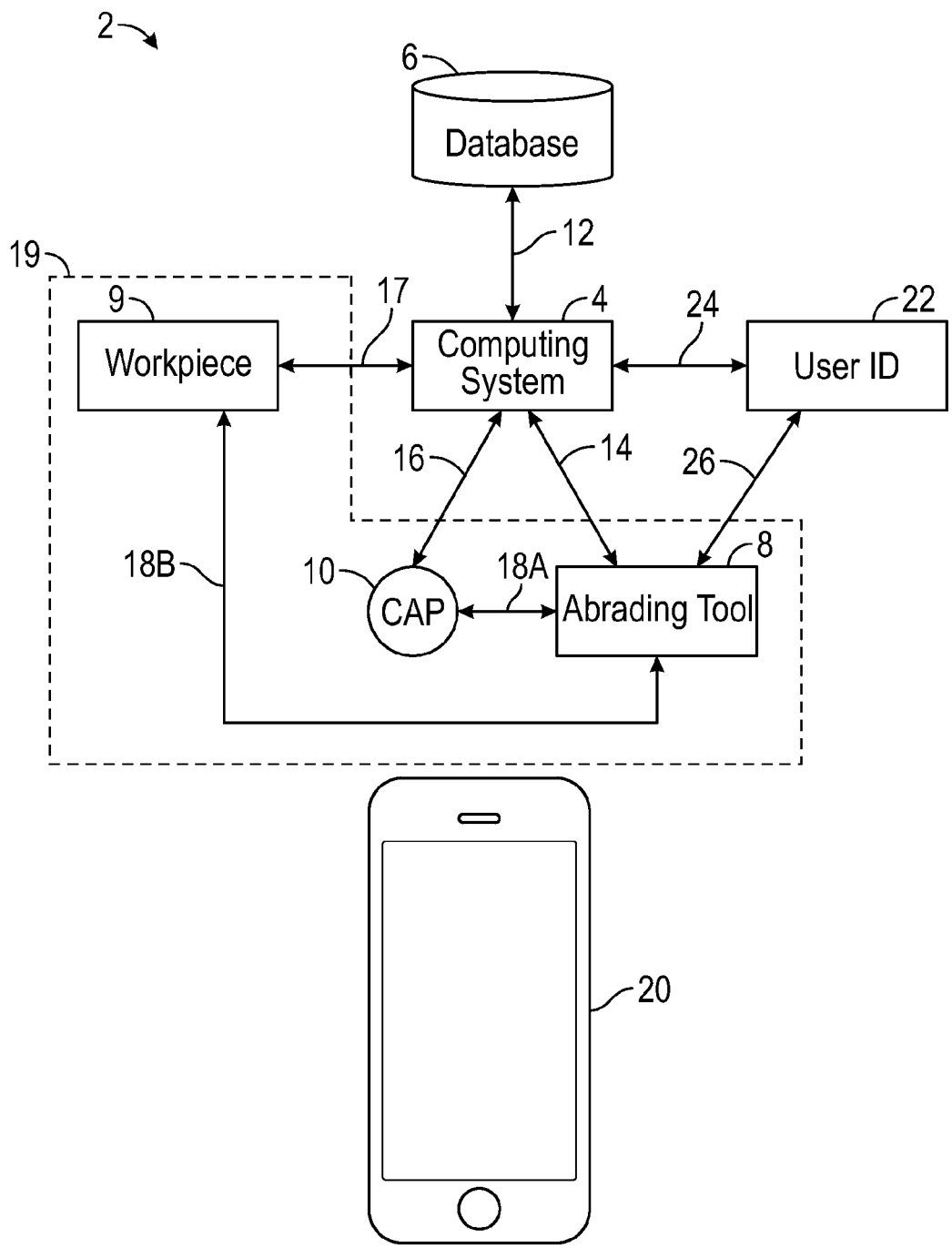
FIG. 1 is a block diagram illustrating an example system for monitoring an abrading tool, a consumable abrasive product, and/or a workpiece, in accordance with one example of the present application.

Abrading tools and associated consumable abrasive products including bonded abrasive wheels present various challenges for individuals and organizations. In one example, inventory of tools, worker information, and consumable abrasive products may not be centrally managed, leading to inconsistent tracking of tool usage. In another example, damaged or worn bonded abrasive wheels can damage workpieces or can have the potential to cause injury. In yet another example, abrading tools can be used improperly, which can result in excessive use of bonded abrasive wheels, damage to abrading tools or workpieces, potential injury to workers, or the like. Furthermore, abrading tools and associated consumable abrasive products including bonded abrasive wheels are frequently stolen. In still another example, over time workers frequently develop an intuitive sense of when a workpiece is of desired quality or when the bonded abrasive wheel is wearing out. However, a robot using the abrading tool may not acquire such an intuitive sense or needs to obtain additional data to enable machine learning to be utilized. In another example, consumable abrasive products, including bonded abrasive wheels are consumed, and therefore, accurate planning and managing of inventory of consumable abrasive products is desirable.

According to one aspect of this disclosure, apparatuses and methods are disclosed that allow for embedding of circuits, such as circuits that facilitate communication within consumable abrasive products, and specifically, within bonded abrasive wheels. Typically, with bonded abrasive wheels, the high heat and/or pressure required in forming (i.e. bonding) such wheels have in the past negated or strongly discouraged the use of embedded circuits because of the high likelihood of failure of such circuits during the forming process. However, the present inventors have recognized various constructs, methods and techniques that have greatly increased the likelihood of the circuits surviving the forming process.

According to another aspect of this disclosure, a system is disclosed that includes communication-equipped abrading tools, communication-equipped consumable abrasive products (CAPs)—here bonded abrasive wheels and/or communication-equipped workpieces. As described herein, in some examples, the abrading tool can read information from the bonded abrasive wheel and, in some cases, can send information to various locations including the bonded abrasive wheel for storage in a data storage device (memory). The data storage device can be located in various places including the cloud, within or on the abrading tool (e.g., in a memory of the abrading tool), within or on a robotic device (e.g., in a memory of the robotic device), etc. Conversely, in some examples, the bonded abrasive wheel can send information to the abrading tool, receive data from the abrading tool, and store data based on the received data. Furthermore, in some examples, the abrading tool sends and/or receives data from a computing system that stores and retrieves information from the data storage device. Thus, the data storage device can comprise a database according to some examples. In some examples, the bonded abrasive wheel sends and/or receives data from the computing system that stores and retrieves information from the database.

As described in detail below, such communication and storage of data can help to address various challenges associated with abrading tools and associated CAPs. These challenges include, but are not limited to, safety challenges, quality challenges and use challenges. For instance, the systems disclosed herein can enable the collection of vibration dosimetry data for individual workers. Some examples of this disclosure can reduce the likelihood of using CAPs in a manner that would produce a poor-quality or undesired quality workpiece. Some examples of this disclosure can reduce the chances of using damaged CAPs. Furthermore, some examples of this disclosure can help to prevent improper use of abrading tools and associated CAPs. Some examples of this disclosure can reduce the potential of injury. Additionally, some examples of this disclosure can help to prevent theft of abrading tools and associated CAPs.

FIG. 1 is a block diagram illustrating an example system 2 for monitoring abrading tools, CAPs (e.g., a bonded abrasive wheel) and/or workpieces, in accordance with one or more techniques of this disclosure. In the example of FIG. 1, system 2 includes a computing system 4, a data storage device 6, an abrading tool 8, a workpiece 9, a consumable abrasive product (CAP) 10 (here a bonded abrasive wheel), and a user identification (ID) 22. As depicted by arrow 12, computing system 4 can read and write data to the data storage device 6, which can comprise a database. Additionally, as depicted by arrow 14, the computing system 4 can communicate with the abrading tool 8. Furthermore, as depicted by arrow 16, the computing system 4 can communicate with the CAP 10. As depicted by arrow 17, the computing system 4 can communicate with the workpiece 9. Additionally, as depicted by arrow 18A, abrading tool 8 can communicate with CAP 10. The abrading tool 8 can communicate with the workpiece 9 as indicated by arrow 18B. Furthermore, as depicted by arrow 24, the computing system 4 can communicate with user ID 22. Additionally, as depicted by arrow 26, the abrading tool 8 can communicate with user ID 22. Communication between one or more of the system 2 components can be facilitated by a communication unit (indicated by arrows 14, 16, 17, 18A, 24 and/or 26). The system 2 can include a sensor(s) 19 that can be implanted in or adjacent one or more of the abrading tool 8, workpiece 9 and CAP 10.

Thus, system 2 optionally includes one or more of the data storage device 6, the computing system 4, the abrading tool 8, the workpiece 9, the CAP 10, the user ID 22 and the sensor 19. The CAP 10 can be attachable to and detachable from the abrading tool 8. The user ID 22 can comprise user identification information, and the computing system 4 can comprise one or more computing devices configured to receive first data and store second data in the data storage device 6. In the disclosed example, the second data can be based on the first data. For instance, the second data can be the same as the first data or determined in various ways using the first data.

As previously discussed, in one example the computing system 4 can receive the first data from the communication unit regarding the sensor 19. The first data can be indicative of at least one operating parameter of one or more of the abrading tool 8, the CAP 10 and the workpiece 9.

In some examples, the first data comprises data received from abrading tool 8. In some instances, the first data is based on the sensor(s) 19 in, on or adjacent the abrading tool 8. Furthermore, in some examples, the first data comprises data received from and regarding the CAP 10 and/or the workpiece 9. As described elsewhere in this disclosure, the first data can be based on the sensor(s) 19 in or on the CAP 10 and/or the workpiece 9. Additionally, in some examples, the first data can comprise user identification information from user ID 22.

In examples of this disclosure, the computing system 4, the abrading tool 8, the workpiece 9, the CAP 10, and the user ID 22 can communicate various types of data, in various ways, at various times, and in response to various events. For instance, in some examples, the CAP 10 can send to the abrading tool 8 and/or the computing system 4 one or more of: use data, quality data, safety data other types of data regarding CAP 10. Use data can include a manufacture data of the CAP 10 (a type of CAP), indication the abrading tool 8 is coupled to the CAP 10, a type of backing used for the CAP 10, a duration of use, a date and time of use, and product authentication data. Use, safety and quality data can include sensor data (e.g., wear, maximum rotations per minute (RPM), other RPM related data, temperature, pressure, force, torque) measured by the sensor(s) 19 generated during usage, or other types of data regarding CAP 10.

In some examples, the user ID 22 can send to abrading tool 8, the CAP 10 and/or computing system 4 the user identification information. In some instances, the CAP 10 can communicate data indicating whether the CAP 10 has been, is or can potentially be damaged (this data is included in the safety data discussed herein). In some examples, certain data (e.g., manufacture date, maximum recommended RPM) can be stored on or within the CAP 10 prior to initial use of CAP 10.

In some examples, the CAP 10 receives, from the abrading tool 8, the workpiece 9 and/or the computing system 4, one or more of the use data, quality data and/or safety data discussed above (e.g., CAP usage time, an operator identifier, operator usage time, abrasive wear state, data enabling dosimetry and wear reporting, and the like). In some examples, certain data (e.g., usage time, operator identification) can be generated during use of the CAP 10, written to the data storage device 6 (which can be coupled to or positioned within the CAP 10), and then subsequently read from the data storage device 6 (which can be coupled to or positioned within the CAP 10).

In some examples, the abrading tool 8 and/or the workpiece 9 receives, from the CAP 10 (the other of the abrading tool 8 and/or workpiece 9) and/or the computing system 4, one or more of the use data, quality data and/or safety data discussed above (e.g., usage time, an operator identifier, operator usage time, finish imparted to the workpiece, data enabling dosimetry and wear reporting, and the like). In some examples, certain data (e.g., usage time, operator identification) can be generated during use of the abrading tool 8, written to the data storage device 6 (which can be coupled to or positioned within the abrading tool 8 such as within the memory), and then subsequently read from the data storage device 6 (which can be coupled to or positioned within the abrading tool 8 such as within the memory). In some examples, the workpiece 9 can include sensor(s) 19 from which sensor data regarding use data, quality data and/or safety data is derived.

Computing system 4 can comprise one or more computing devices, such as personal computers, server devices, mainframe computers, and other types of devices. The data storage device 6 comprises the database with an organized collection of data. The data storage device 6 can be implemented in various ways. For example, the data storage device 6 can comprise one or more relational databases such as a quasi-logarithmic database discussed in reference to later of the FIGURES, object-oriented databases, data cubes, and so on. Although FIG. 1 shows the data storage device 6 as a single database, data described in the disclosure as being stored in the data storage device 6 can be distributed across one or more separate databases, the cloud, etc. These database/databases can be stored on non-transitory computer readable data storage media.

The CAP 10, the workpiece 9 and/or the abrading tool 8 can communicate in various ways that can be facilitated by the communication unit (or indeed via multiple communication units). For example, the CAP 10 can have the communication unit mounted therein or mounted thereto. The communication unit in this case can be a Radio Frequency Identifier (RFID) or Near Field Communication (NFC) interface (i.e., a tag). FIGS. 1B-16 provide further examples of the communication unit comprising a circuit (RFID or NFC) that can be embedded within a bonded abrasive wheel.

In some examples, the abrading tool 8 can have the communication unit mounted therein or mounted thereto. In such cases, this communication unit can be RFID or NFC reader, configured to read data from and/or write data to the RFID or NFC interface of the CAP 10 when the CAP 10 is brought sufficiently close to the abrading tool 8. Thus, in this example, the CAP 10 and the abrading tool 8 can communicate without the use of Wi-Fi, Bluetooth or other similar wireless technologies.

In some examples, the communication unit can use energy harvesting techniques to derive power needed for charging, communication, sensing, data storage, and other operations. These techniques can be applied from external to the CAP 10, such as from the abrading tool 8.

The CAP 10 can have a communication unit, such as an RFID or NFC tag. In this example, a tag reading device, such as a fixed location device or wand, can read data from the communication unit mounted on or within the CAP 10. The tag reading device can send the data to the computing system 4. In another example, a mobile device 20 such as shown in FIG. 1 (such as a worker's mobile phone) can read data from the communication unit and send the data to the computing system 4 via a communications network. In some examples, mobile device 20 can perform some or all of the functionality described in this disclosure with respect to the computing system 4. Indeed, the mobile device 20 can receive alerts, notifications, etc. in some cases of certain events (e.g., a notification that the CAP 10 is in an unsafe condition and is subject to breakage or possible breakage). Thus, in some examples, the communication network used by the communication unit(s) can include the Internet, a cellular data network, a Wi-Fi network, and/or another type of communication networks.

The user ID 22 and the abrading tool 8 can communicate in various ways. For example, the user ID 22 can utilize a communication unit, such as a Radio Frequency Identifier (RFID) or Near Field Communication (NFC) interface (i.e., tag). In some examples, the abrading tool 8 can utilize the communication unit, such as an RFID or NFC reader, configured to read data from and/or write data to the RFID or NFC interface of the user ID 22 when user ID 22 is brought sufficiently close to the abrading tool 8. Thus, in this example, the CAP 10 and the abrading tool 8 can communicate without Wi-Fi or Bluetooth infrastructure. In some examples, the communication unit of the user ID 22 can use energy harvesting techniques as previously discussed herein. In some examples, the user ID 22 can utilize an optical code as the communication unit. The optical code can comprise a machine-readable representation of data, such as a barcode or Quick Response (QR) code. The abrading tool 8 or another device can receive data from the user ID 22 by reading the optical code, and such data can allow the abrading tool 8 to become operable, for example.

The user ID 22 and the computing system 4 can communicate in various ways via the communication unit (indicated by arrow 24). For example, the user ID 22 can utilize an RFID or NFC tag. In this example, a tag reading device, such as a fixed location device or wand, can read data from the communication unit of the user ID 22. The tag reading device can send the data to the computing system 4 via a communications network. In another example, the mobile device 20 (such as a worker's mobile phone) can read data from the communication unit of user ID 22 and send the data to the computing system 4 via a communications network. In yet another example, the mobile device 20 can comprise the user ID 22 and can send the data to the computing system 4 via the communications network. In some examples, the mobile device 20 can perform some or all of the functionality described in this disclosure with respect to the computing system 4. The communication network utilized can include the Internet, a cellular data network, a Wi-Fi network, and/or another type of communication networks.

The abrading tool 8 and the computing system 4 can communicate in various ways. For example, the abrading tool 8 can utilize the communication unit, such as an RFID or NFC interface (e.g., an RFID or NFC tag). In this example, a tag reading device, such as a fixed location device or wand, can read data from the communication unit of the abrading tool 8 and send the data to the computing system 4 via a communications network. In some examples, the abrading tool 8 can utilize a wireless network interface, such as a Wi-Fi interface, Bluetooth interface, cellular data network interface (e.g., a 4G LTE interface), and/or another type of wireless network interface. In such examples, the abrading tool 8 can use the wireless network interface to send and/or receive data from the computing system 4. In some examples, abrading tool 8 can use a communication unit that is a wire-based communication interface, such as a Universal Serial Bus (USB) interface or another type of interface. In such examples, the abrading tool 8 can use the wire-based communications interface to send and/or receive data from the computing system 4. For instance, the abrading tool 8 can use a USB connection with another device, such as the mobile device 20, that is configured to communicate with the computing system 4. In this example, the abrading tool 8 can communicate with the computing system 4 while connected to the mobile device 20. In some examples, the abrading tool 8 can utilize an internal communication bus, such as a serial peripheral interface (SPI) bus or I2C bus. In such examples, the abrading tool 8 can use the internal communication bus to send and/or receive data from the computing system 4.

Furthermore, in some examples, abrading tool 8 has a communication unit that communicates with the computing system 4 via hub wireless hardware. The hub wireless hardware can comprise a device located at a worksite to which multiple assets (e.g., tools, personal protection equipment, consumable products, etc.) communicate. In this example, the hub wireless hardware can communicate via another network (e.g., the internet) to the computing system 4.

In some examples, the abrading tool 8, the workpiece 9, and/or the CAP 10 can communicate with the computing system 4 via the mobile device 20. For instance, the abrading tool 8 can utilize a communication unit, such as an RFID or NFC tag, Bluetooth interface, or other short-range wireless communication interface. In this example, the mobile device 20 can relay data between computing system 4 and abrading tool 8.

In some examples, the communication unit of the abrading tool 8 does not communicate directly with the communication unit of the CAP 10. For instance, the abrading tool 8 can send data to the computing system 4 and the computing system 4, in response, can send data to the communication unit and/or the data storage device 6 housed within the CAP 10. Similarly, the CAP 10 can send data to the computing system 4 and the computing system 4, in response, can send data to the abrading tool 8 (e.g., to memory of the abrading tool 8). In some examples, the mobile device 20 can read data from the CAP 10 and, in response, send data to the abrading tool 8. Similarly, the abrading tool 8 can send data to the mobile device 20 and the mobile device 20 can send the data to the CAP 10. In further examples, the mobile device 20 can read data from the workpiece 9, and in response, send data to the abrading tool 8 and/or the CAP 10. Similarly, the workpiece 9 can send data to the mobile device 20 and the mobile device 20 can send the data to the CAP 10 and/or the abrading tool 8.

In some examples, communication between the abrading tool 8, the workpiece 9 and/or the CAP 10 and computing system 4 can occur asynchronously. For instance, data from the computing system 4 can be stored at an intermediary device (e.g., the mobile device 20, wireless hub hardware, an RFID or NFC reader, etc.) until a communication link between the abrading tool 8, the workpiece 9 and/or the CAP 10 and the intermediary device is established. When the communication link is established, the intermediary device transmits or receives the data to or from the abrading tool 8, the workpiece 9 and/or the CAP 10. A similar asynchronous communication style can be used for communication between CAP 10 and computing system 4.

In some examples, abrading tool 8, the workpiece 9, and/or the CAP 10, and the user ID 22 can communicate with the computing system 4 in a similar way. For example, the abrading tool 8, the CAP 10, and the user ID 22 can all utilize a same communication unit, such as an RFID or NFC tag, while the computing system 4 can include or be communicatively coupled, such as through a USB cable, to a tag reading device, such as an RFID or NFC tag reader. In this example, the tag reading device, such as a fixed location device or wand, can read data from the communication unit of abrading tool 8, the workpiece 9, the CAP 10, and/or user ID 22. The tag reading device can send the data to the computing system 4 via a communications network. In another example, the mobile device 20 (such as a worker's mobile phone) can read data from the communication unit of the abrading tool 8, the workpiece 9, the CAP 10, and/or the user ID 22 and send the data to the computing system 4 via a communications network. The communication network can include the Internet, a cellular data network, a Wi-Fi network, and/or another type of communication network as previously discussed.

In some examples, the computing system 4 can mine data stored in the data storage device 6. For instance, the computing system 4 can mine data in the data storage device 6 for data that is then report to and receive fed back from appropriate entities, e.g., safety or compliance manager, production foreman, maintenance manager, and so on such a via a text or another alert notification method. In some examples, the computing system 4 can associate the reported data with an urgency level. For instance, reporting that the abrading tool 8 is being operated beyond recommended Rotation Per Minute (RPM) level can be designated as more urgent than reporting that a sanding disk inventory is running low. The RPM reporting can be a safety, compliance, or productivity issue which might need to be reported as soon as possible to the safety officer or shop foreman; low inventory can be reported to a purchasing agent with less urgency.

In further examples, the computing system 4 can be configured to only store data to the data storage device 6 in certain instances when the computing system 4 identifies if the at least one operating parameter falls outside a predetermined operating parameter range. This can reduce power and memory burden for the system, for example. In such instances, data can be written to the data storage device 6, such operating parameter range(s) can include, but is not limited to: revolutions per minute of the abrading tool or the consumable abrasive product, a type of the abrading tool; a type of the consumable abrasive product; a force applied on one or more of the abrading tool, the consumable abrasive product and the workpiece; a temperature of one or more of the abrading tool, the consumable abrasive product and the workpiece; a finish imparted to the workpiece; a duration of operation; a type of backing used for the consumable abrasive product; a type of attachment used to couple the abrading tool to the consumable abrasive product; an identity of a tool operator; a location of the system; a date and time of use; and an indication the abrading tool is coupled with the consumable abrasive product.

Thus, for example, if the revolutions per minute maximum for the CAP 10 is exceeded, data regarding such event/operation is written to the data storage device 6. In another example, if the force applied on one or more of the abrading tool, the consumable abrasive product and the workpiece exceeds a maximum recommended force (or indeed is less than a recommended force) data regarding such event/operation is written to the data storage device 6. In yet a further example, if the temperature of one or more of the abrading tool, the consumable abrasive product and the workpiece exceeds a maximum recommended temperature data regarding such event/operation is written to the data storage device 6.

In some examples, the computing system 4 can be configured to only store data to the data storage device 6 in certain instances where the computing system 4 identifies the CAP 10 has been damaged or is about to be potentially damaged based upon the at least one operating parameter falling outside the predetermined operating parameter range. Thus, in response to receiving data indicating that the CAP 10 has been damaged or is about to be potentially damaged, the computing system 4 can be configured to store the data in the data storage device 6. Furthermore, in some examples, in response to receiving data indicating that the CAP 10 has been damaged or is about to be potentially damaged, the computing system 4 can be configured to perform one or more of: generate a warning, send instructions to the abrading tool or a robotic device configured to operate the abrading tool, prevent use of the abrading tool while the consumable abrasive product is attached to the abrading tool, and store the data indicating that the consumable abrasive product has been damaged or is about to be potentially damaged as the second data. The data indicating that the CAP 10 has been damaged or is about to be potentially damaged can be derived from one or more of a voltage measurement from a crack detection system, the temperature the consumable abrasive product, the revolutions per minute of the consumable abrasive product and the force on the consumable abrasive product as is further elaborated upon herein.

Additionally, in further examples, the computing system 4 can mine and/or analyze data in the data storage device 6 for information on productivity, security, inventory, safety, quality or other topics. For example, the computing system 4 can generate various types of reports on these topics. Productivity: reporting on tool RPM, runtime, force, etc., basically how the tool and abrasive is being used. Security: has abrading tool 8 disappeared? Inventory: is the site running low on a specific product, such as CAPs? Computing system 4 can automatically place orders. Safety: is PPE being used correctly? Is a worker using the proper abrading tool? Is the worker using an abrading tool properly? Quality: is a desired finish to the workpiece being achieved?

Examples of this disclosure can be used separately or in combination. Some examples of the disclosure can omit certain components of the system 2, for example, the computing system 4, the data storage device 6, the sensor 19, the communication unit, the mobile device 20, and any of the abrading tool 8, the workpiece 9, the CAP 10, and/or the user ID 22. Examples of this disclosure can be configured in any operable configuration. Certain components such as the sensor 19 and the communication unit(s) can comprise a single component, for example. In another example, while the computing system 4 and the data storage device 6 have been described as separate units, either or both can be part of the same network. Similarly, the computing system 4 and/or the communication unit(s) described need not be coupled to or part of any of the abrading tool 8, the CAP 10, the mobile device 20, but can be located on an external device, such as in proximity to a workstation or on a local server or remote server, for example.

Further disclosure regarding systems, methods and techniques for monitoring abrading tools, CAPs and workpieces can be found in co-owned and co-pending U.S. Provisional Patent Application, entitled "ABRASIVE DATA RECORDER SYSTEM", filed on the even day as the present application, the entire contents of which are incorporated by reference in their entirety.

Figure 1A:
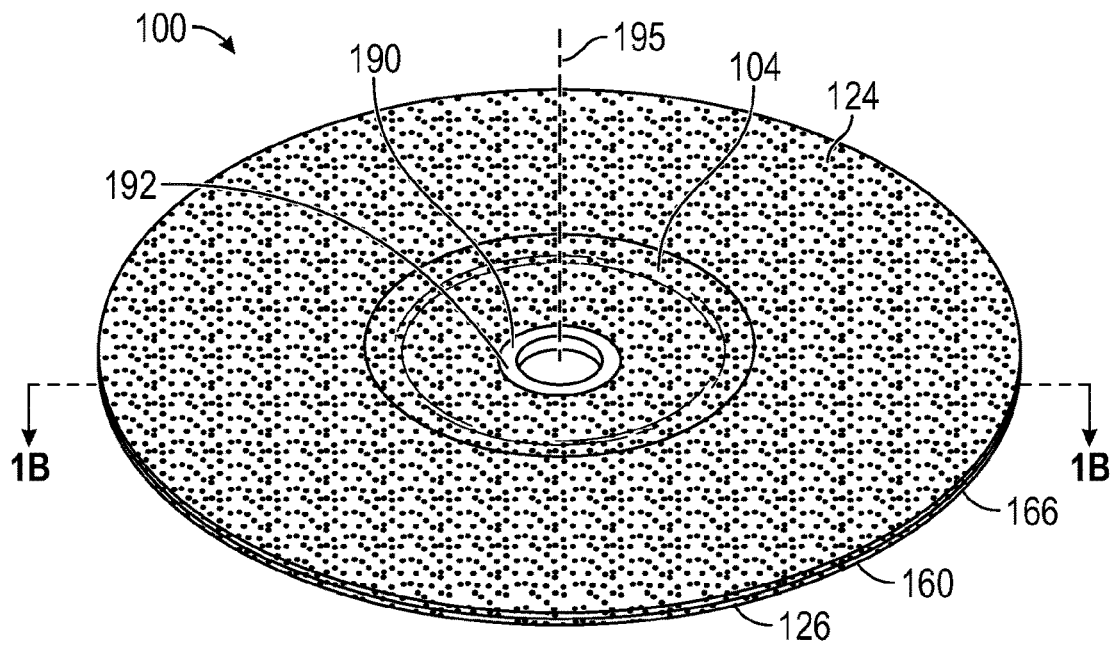
FIG. 1A is a schematic perspective view of an exemplary bonded abrasive wheel in accordance with one example of the present application.
Figure 1B:
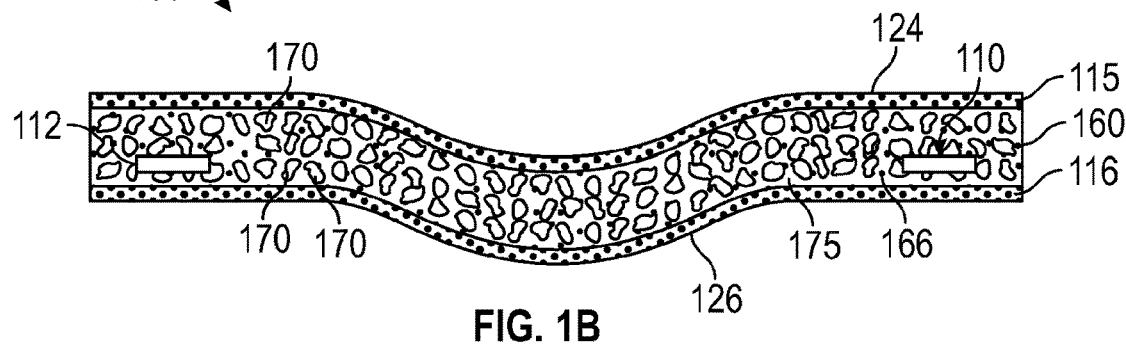
FIG. 1B is a schematic cross-sectional view of the bonded abrasive wheel of FIG. 1A including a portion of an embedded circuit taken along line 1A-1A.

FIGS. 1A and 1B show an example of a bonded abrasive wheel 100 according to an example of the present application. The bonded abrasive wheel 100 (shown as a depressed-center bonded abrasive wheel) has a depressed central portion 104 encircling a central hub 190 that extends from an abrading surface 124 (also called a front surface) to a back surface 126 (also called an opposing surface). The central hub 190 can comprise a bushing 192, which can be used, for example, for attachment to a power driven tool (not shown). In some examples, the bushing 192 can be constructed so as to minimize interference with the circuits described herein. Thus, for example, the bushing 192 can be comprised of a non-metallic material (e.g., a polymer), for example. In other examples the bushing 192 can be split and/or may not extend entirely through the bonded abrasive wheel 100. An abrasive layer 160 comprises abrasive particles 170 (e.g., crushed but in other examples shaped) retained in binder 175. The abrasive layer 160 optionally further comprises reinforcing material 115 adjacent to the abrading surface 124. The abrasive layer 160 optionally further comprises a secondary reinforcing material 116 adjacent to the back surface 126.

The bonded abrasive wheel 100 has a rotational axis 195 around which the wheel rotates in use, and which is generally perpendicular to the disc of the bonded abrasive wheel.

The layer 160 comprises a curable composition that includes the binder 175 that retains abrasive particles 170. The binder 175 may be inorganic (e.g., vitreous) or organic resin-based, and is typically formed from a respective binder precursor.

Suitable binders may be vitreous or organic, for example, as described hereinbelow. Organic binders (e.g., crosslinked organic polymers) are generally prepared by curing (i.e., crosslinking) a resinous organic binder precursor. Examples of suitable organic binder precursors include thermally-curable resins and radiation-curable resins, which may be cured, for example, thermally and/or by exposure to radiation. Exemplary organic binder precursors include glues, phenolic resins, aminoplast resins, urea-formaldehyde resins, melamine-formaldehyde resins, urethane resins, acrylic resins (e.g., aminoplast resins having unsaturated groups, acrylated urethanes, acrylated epoxy resins, acrylated isocyanurates), acrylic monomer/oligomer resins, epoxy resins (including bismaleimide and fluorene-modified epoxy resins), isocyanurate resins, an combinations thereof. Curatives such as thermal initiators, catalysts, photoinitiators, hardeners, and the like may be added to the organic binder precursor, typically selected and in an effective amount according to the resin system chosen. Exemplary organic binders can be found in U.S. Pat. No. 5,766,277 (DeVoe et al.).

Typically, organic binders are prepared by crosslinking (e.g., at least partially curing and/or polymerizing) an organic binder precursor. Suitable organic binder precursors for the shaped abrasive composites may be the same as, or different from, organic binder precursors that can be used in the layer described hereinabove. During the manufacture of the structured abrasive article, the organic binder precursor may be exposed to an energy source which aids in the initiation of polymerization (typically including crosslinking) of the organic binder precursor. Examples of energy sources include thermal energy and radiation energy which includes electron beam, ultraviolet light, and visible light. In the case of an electron beam energy source, curative is not necessarily required because the electron beam itself generates free radicals.

After this polymerization process, the organic binder precursor is converted into a solidified organic binder. Alternatively, for a thermoplastic organic binder precursor, during the manufacture of the abrasive article the thermoplastic organic binder precursor is cooled to a degree that results in solidification of the organic binder precursor.

Organic binders are contemplated in amounts of from 5 to 50 percent by weight, more preferably 10 to 40 percent by weight, and even more preferably 15 to 40 percent by weight, based on the total weight of the respective first and secondary abrasive layers, however other amounts may also be used. The organic binder is typically formed by at least partially curing a corresponding organic binder precursor.

There are two main classes of polymerizable resins that may preferably be included in the organic binder precursor, condensation polymerizable resins and addition polymerizable resins. Addition polymerizable resins are advantageous because they are readily cured by exposure to radiation energy. Addition polymerized resins can polymerize, for example, through a cationic mechanism or a free-radical mechanism. Depending upon the energy source that is utilized and the binder precursor chemistry, a curing agent, initiator, or catalyst may be useful to help initiate the polymerization. Examples of typical binder precursors include phenolic resins, urea-formaldehyde resins, aminoplast resins, urethane resins, melamine formaldehyde resins, cyanate resins, isocyanurate resins, (meth)acrylate resins (e.g., (meth)acrylated urethanes, (meth)acrylated epoxies, ethylenically-unsaturated free-radically polymerizable compounds, aminoplast derivatives having pendant alpha, beta-unsaturated carbonyl groups, isocyanurate derivatives having at least one pendant acrylate group, and isocyanate derivatives having at least one pendant acrylate group) vinyl ethers, epoxy resins, and mixtures and combinations thereof. As used herein, the term "(meth)acryl" encompasses acryl and methacryl.

Phenolic resin is an exemplary useful organic binder precursor, and may be used in powder form and/or liquid state. Organic binder precursors that can be cured (i.e., polymerized and/or crosslinked) to form useful organic binders include, for example, one or more phenolic resins (including novolac and/or resole phenolic resins) one or more epoxy resins, one or more urea-formaldehyde binders, one or more polyester resins, one or more polyimide resins, one or more rubbers, one or more polybenzimidazole resins, one or more shellacs, one or more acrylic monomers and/or oligomers, and combinations thereof. The organic binder precursor(s) may be combined with additional components such as, for example, curatives, hardeners, catalysts, initiators, colorants, antistatic agents, grinding aids, and lubricants.

Conditions for curing each of the foregoing are well-known to those of ordinary skill in the art.

Useful phenolic resins include novolac and resole phenolic resins. Novolac phenolic resins are characterized by being acid-catalyzed and having a ratio of formaldehyde to phenol of less than one, typically between 0.5:1 and 0.8:1. Resole phenolic resins are characterized by being alkaline catalyzed and having a ratio of formaldehyde to phenol of greater than or equal to one, typically from 1:1 to 3:1. Novolac and resole phenolic resins may be chemically modified (e.g., by reaction with epoxy compounds), or they may be unmodified. Exemplary acidic catalysts suitable for curing phenolic resins include sulfuric, hydrochloric, phosphoric, oxalic, and p-toluenesulfonic acids. Alkaline catalysts suitable for curing phenolic resins include sodium hydroxide, barium hydroxide, potassium hydroxide, calcium hydroxide, organic amines, or sodium carbonate.

Phenolic resins are well-known and readily available from commercial sources. Examples of commercially available novolac resins include DUREZ 1364, a two-step, powdered phenolic resin (marketed by Durez Corporation, Addison, Tex., under the trade designation VARCUM (e.g., 29302), or HEXION AD5534 RESIN (marketed by Hexion Specialty Chemicals, Inc., Louisville, Ky.).

Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co., Bartow, Fla. under the trade designation AEROFENE (e.g., AEROFENE 295); and those marketed by Kangnam Chemical Company Ltd., Seoul, South Korea under the trade designation "PHENOLITE" (e.g., PHENOLITE TD-2207).

Curing temperatures of thermally curable organic binder precursors will vary with the material chosen and wheel design. Selection of suitable conditions is within the capability of one of ordinary skill in the art. Exemplary conditions for a phenolic binder may include an applied pressure of about 20 tons per 4 inches diameter (224 kg/cm$^2$) at room temperature followed by heating at temperatures up to about 185° C. for sufficient time to cure the organic binder material precursor.

The abrasive particles 170 contemplated for use herein can comprise either shaped or non-shaped (e.g., crushed) particles of various material(s) including, but not limited to metals, ceramics, composites, etc. The abrasive particles 170, if ceramic, can comprise any ceramic material (preferably a ceramic abrasive material), for example, selected from among the ceramic materials listed below, and combinations thereof. Ceramic materials contemplated can include, for example, alumina (e.g., fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn.), black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). Further details concerning methods of making sol-gel-derived ceramic particles suitable or use as ceramic bodies can be found in, for example, U.S. Pat. No. 4,314,827 (Leitheiser), U.S. Pat. No. 5,152,917 (Pieper et al.), U.S. Pat. No. 5,213,591 (Celikkaya et al.), U.S. Pat. No. 5,435,816 (Spurgeon et al.), U.S. Pat. No. 5,672,097 (Hoopman et al.), U.S. Pat. No. 5,946,991 (Hoopman et al.), U.S. Pat. No. 5,975,987 (Hoopman et al.), and U.S. Pat. No. 6,129,540 (Hoopman et al.), and in U.S. Publ. Pat. Appln. Nos. 2009/0165394 A1 (Culler et al.) and 2009/0169816 A1 (Erickson et al.).

Shaped abrasive particles and precisely-shaped abrasive particles may be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. In some embodiments, the ceramic bodies are precisely-shaped (i.e., the ceramic bodies have shapes that are at least partially determined by the shapes of cavities in a production tool used to make them).

Exemplary shapes of abrasive particles if shaped include cylindrical, vermiform, hourglass-shaped, bow tie shaped, truncated pyramids (e.g., 3-, 4-, 5-, or 6-sided truncated pyramids), truncated cones, and prisms (e.g., 3-, 4-, 5-, or 6-sided prisms), and crushed ceramic abrasive particles. Useful ceramic bodies may have an average aspect ratio (i.e., length to thickness ratio) of at least 2, in some embodiments at least 4, in some embodiments at least 5, and in some embodiments at least 8. Useful ceramic platelets include triangular ceramic platelets (e.g., triangular prismatic ceramic platelets and truncated triangular ceramic platelets).

Details concerning such shaped ceramic particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

Other contemplated material for the abrasive particles 170 include those of fused aluminum oxide, heat treated aluminum oxide, white fused aluminum oxide, ceramic aluminum oxide materials such as those commercially available under the trade designation 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived abrasive particles, iron oxide, chromia, ceria, zirconia, titania, silicates, tin oxide, silica (such as quartz, glass beads, glass bubbles and glass fibers) silicates (such as talc, clays (e.g., montmorillonite), feldspar, mica, calcium silicate, calcium metasilicate, sodium aluminosilicate, sodium silicate), flint, and emery. Examples of sol-gel derived abrasive particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.)

Abrasive particles used in the bonded abrasive wheels of the present disclosure, may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60 or FEPA P60 and P80 grading standards.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the shaped ceramic abrasive particles pass through a test sieve meeting ASTM E-11 specifications for the number 18 sieve and are retained on a test sieve meeting ASTM E-11 specifications for the number 20 sieve. In one embodiment, the shaped ceramic abrasive particles have a particle size such that most of the particles pass through an 18 mesh test sieve and can be retained on a 20, 25, 30, 35, 40, 45, or 50 mesh test sieve. In various embodiments, the shaped ceramic abrasive particles can have a nominal screened grade comprising: −18+20, −20/+25, −25+30, −30+35, −35+40, 5−40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

Abrasive particles may be uniformly or non-uniformly distributed throughout the primary abrasive layer and several types of abrasive particles can be used in combination. For example, abrasive particles with sharper edges and/or larger can be distributed in the bonded abrasive wheel so as to be concentrated toward the from outer surfaces thereof. Smaller and/or particles having less edges or less sharp edges can be concentrated near the circuits described subsequently. A center portion of the bonded abrasive wheel may contain a lesser amount of abrasive particles relative to other locations. The abrasive particles may be homogenously distributed among each other, however, such is not always the case.

The abrasive layer may contain additional components such as, for example, filler particles, subject to weight range requirements of the other constituents being met. Filler particles may be added to occupy space and/or provide porosity. Porosity enables the bonded abrasive wheel to shed used or worn abrasive particles to expose new or fresh abrasive particles. The abrasive layer may have any range of porosity; for example, from about 1 percent to 50 percent, typically 1 percent to 40 percent by volume. Examples of fillers include bubbles and beads (e.g., glass, ceramic (alumina), clay, polymeric, metal), cork, gypsum, marble, limestone, flint, silica, aluminum silicate, and combinations thereof.

Bonded abrasive wheels (and especially depressed-center bonded abrasive wheels) according to the present disclosure preferably have one or more additional layers or discs of reinforcing material integrally molded and bonded therein. One layer of reinforcing material is preferably bonded to and situated in between the secondary and primary abrasive layers of the wheel. In some embodiments, a central hub portion of the abrasive wheel adjacent the central hub may be further reinforced with a disc of fiberglass cloth molded in and bonded to the bottom side of the primary abrasive layer. As discussed hereinabove, bonded abrasive wheels according to the present disclosure may include one or more reinforcing materials (e.g., a woven fabric, a knitted fabric, a nonwoven fabric, and/or a scrim) that reinforces the bonded abrasive wheel. The reinforcing material may comprise inorganic fibers (e.g., fiberglass) and/or organic fibers such as polyamide fibers, polyester fibers, or polyimide fibers. In some instances, it may be desirable to include reinforcing staple fibers within the first and/or second organic binders so that the fibers are homogeneously dispersed throughout the bonded abrasive wheel.

Bonded abrasive wheels according to the present disclosure can be made by a molding process. During molding, first and second organic binder precursors, which may be liquid or powdered, or a combination of liquid and powder, is mixed with abrasive particles. In some embodiments, a liquid medium (either curable organic resin or a solvent) is first applied to the abrasive particles to wet their outer surface, and then the wetted abrasive particles are mixed with a powdered organic binder precursor. Bonded abrasive wheels according to the present disclosure may be made, for example, by compression molding, injection molding, and/or transfer molding.

Figure 14:
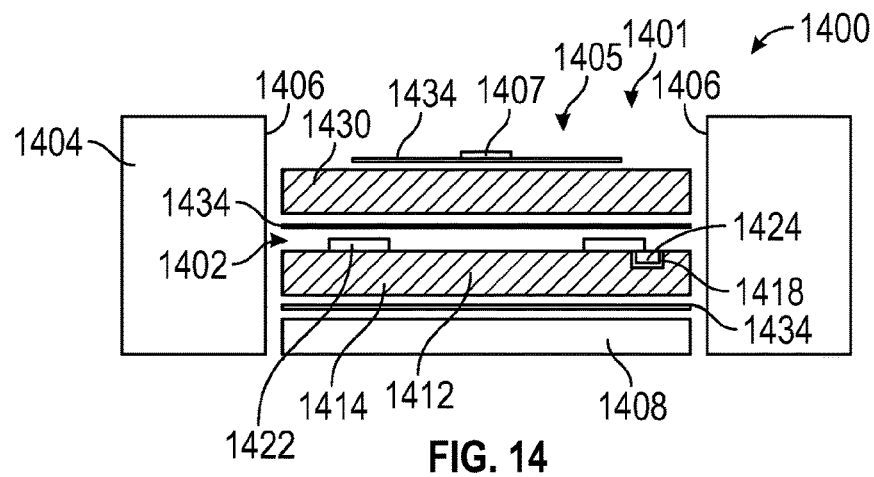
FIG. 14 is a side schematic cross-sectional view of a mold for forming an bonded abrasive wheel and including a circuit, bushing, several layers of curable compositions and scrims, in accordance with one example of the present application.
Figure 16:
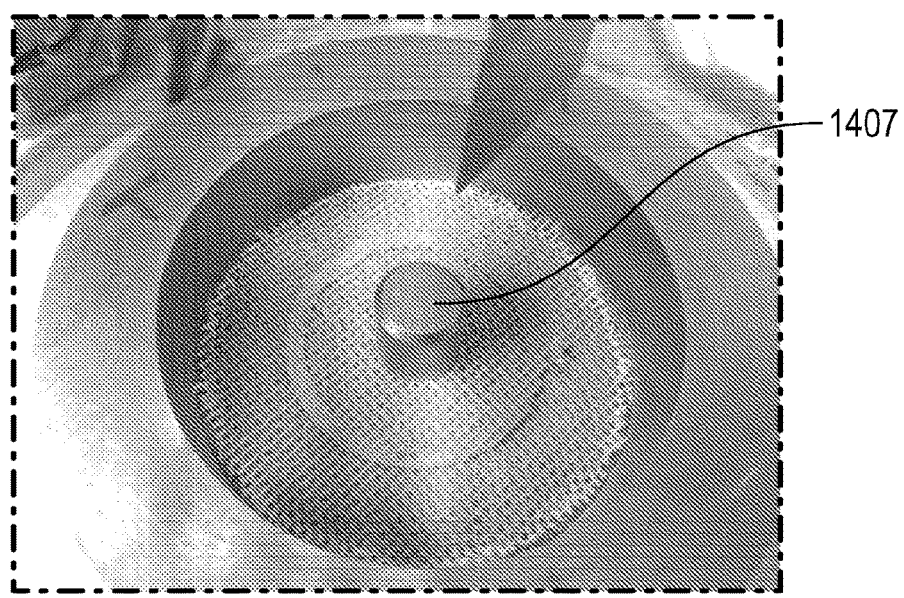
FIG. 16 shows a mold, circuit and scrims that are used in accordance with the Working Example.

For example, in one exemplary process with aspects partially shown in FIGS. 14 and 16, a mold (reference FIGS. 14 and 16) having a central-aperture-forming arbor (reference FIG. 16) can be surrounded by a circular cavity in which the center is optionally depressed (e.g., for making depressed-center or raised-hub wheels). Bonded abrasive wheels may be molded by first placing a disc of reinforcing material having a center hole around the arbor and in contact with the bottom of the mold. Then, spreading a uniform layer of curable composition comprising the abrasive particles, and the organic binder precursor on top of the disc of reinforcing material. Next a circuit (construct further shown and disclosed below) can be added to the mold atop the first layer of the curable composition. Next, another disc of reinforcing material with a center hole positioned around the arbor is placed onto the first layer of the curable composition, followed by spreading a second layer of the curable composition comprising the abrasive particles, and the binder precursor thereon. This method sandwiches the circuit between the two layers of curable composition and the two layers of reinforcing material. Lastly, a hub reinforcing disc with a center hole therein is placed around the arbor and onto the layer of the curable composite, and a top mold plate of the desired shape to either produce the depressed-center or the straight center hub portion of the wheels, is placed on top of the layers to form a mold assembly. The mold assembly is then placed between the platens of either a conventional cold or hot press. Then the press is actuated to force the mold plate downwardly and compress the discs and abrasive mixtures together, at a pressure of from 1 to 4 tons per square inch, into a self-supporting structure of predetermined thickness, diameter and density. After molding the wheel is stripped from the mold and placed in an oven heated (e.g., to a temperature of approximately 175° C. to 200° C. for approximately 36 hours) to cure the curable mixture(s) and convert the organic binder precursor(s) into useful organic binder(s).

Further details regarding the construction of the abrasive grinding wheel can be found in Patent Cooperation Treaty (PCT) Publication No. WO2018080704, entitled "BONDED ABRASIVE WHEEL AND METHOD OF MAKING THE SAME", filed Oct. 25, 2016, and co-owned by the applicant, the entire disclosure of which is incorporated by reference in its entirety.

FIG. 1B also shows a portion of a circuit 110 comprising an antenna 112 embedded within the bonded abrasive wheel 100 adjacent the back surface 126, thereof. For the circuit 110 configured for NFC, the antenna 112 can be spaced away from either the first grinding surface 124 or the back surface 126 by between 0.1% and 200% percent of the radius of curvature of the antenna. Exemplary constructs of the circuit 110 are further illustrated in FIGS. 2-13 and 16 and discussed in reference to those FIGURES. As discussed in FIG. 1, the circuit 110 and the other circuits discussed herein can be configured to facilitate communication in various ways to convey or receive data, including data from one or more sensors (e.g., sensors 19) that are not specifically shown in the remaining FIGS. 2-16.

Figure 2:
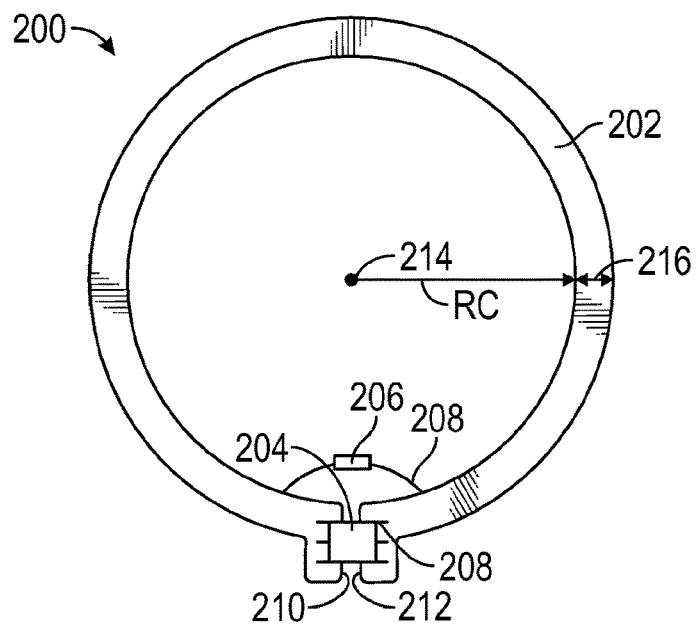
FIG. 2 is a top schematic cross-sectional view of an example circuit that can be used within the bonded abrasive wheel, in accordance with one example of the present application.

FIGS. 2 and 2A show an exemplary circuit 200 configured for RFID or NFC communication. The circuit 200 can include an antenna 202, an integrated circuit (IC) 204, a capacitor 206 and leads 208.

As shown the antenna 202 can be operably coupled (electrically connected in a manner to facilitate the movement of electrical current) to the IC 204 via the leads 208. The capacitor 206 can optionally be utilized, and can be operatively coupled in parallel with the IC 204 to the antenna 202 via the leads 208. The IC 204 and/or the capacitor 206 may be coupled to the antenna directly without the use of leads 208 in the form of a leadless package, unpackaged IC, etc. Although shown as substantially a single loop having a circular substantially constant radius of curvature as described below, in other examples, further loops and other circuit shapes are contemplated including those that are non-circular and do not utilize a radius of curvature or have a varying radius of curvature throughout most/all of their extent.

According to the example of FIGS. 2 and 2A, the antenna 202 can configured to communicate with one or more external devices in the manner previously discussed in reference to FIG. 1. The antenna 202 can include a first end 210 and a second end 212. The antenna 202 can have a radius of curvature RC about an axis 214 along at least a portion thereof such that the first end 210 can be disposed adjacent to but is spaced from the second end 212. Such spacing between the first end 210 and the second end 212 can amount to a distance of less than 0.3 inch in the case of the example of FIGS. 2 and 2A. The axis 214 can comprise an axis of symmetry of the antenna 202 according to some examples including the example of FIGS. 2 and 2A. In some examples, the axis 214 can substantially align with the axis 195 (FIGS. 1A and 1B) of the bonded abrasive wheel. However, in other examples the axis can be offset from that of the axis 195.

As shown in FIGS. 2 and 2A, the antenna 202 can comprise a single non-complete loop with the first end 210 spaced a short distance from but interfacing with the second end 212. According to one example, the antenna 202 can have a radius of curvature RC of between about 0.5 inch and about 2 inches and can have a width 216 of between about 0.10 inch and about 0.75 inches. Additionally, the width 216 can vary according to the radius of curvature RC such as to be a ratio thereof. For example, the width 216 can be about 50% of the radius of curvature RC in some examples. The thickness of the antenna 202 can be greater than 0.001 inches thick to about 0.02 inches thick in some examples. However, other geometries for the antenna 202 are contemplated and can vary depending upon the application, desired resonant frequency, position of the antenna 202 within the bonded abrasive wheel, the size (e.g., diameter) of the bonded abrasive wheel, and other operational factors. In some cases, it is desirable to have the radius of curvature RC of the antenna 202 be sufficiently larger than depressed central portion 104 (FIG. 1A) of the bonded abrasive wheel.

The antenna 202 according to the example of FIGS. 2 and 2A can comprise a metallic foil such as a copper foil, copper alloy foil, aluminum foil, aluminum alloy foil, alloys thereof, or the like. The antenna 202 can also be constructed of a composite including a polymer foil in some cases. The antenna 202 can be laminated with several foil layers combined together. For example, an aluminum foil and a polymer film can be heat laminated together. Suitable polymer films include elastomeric polyurethane, co-polyester, polyimide, polysulfide, silicone or polyether block amide films. In other embodiments, a material is extruded directly onto a metallic foil forming a substrate layer attached to the metallic foil. For example, a polyurethane resin may be extruded onto a copper foil. In other embodiments, a material, such as a urethane, is solvent coated onto a metallic foil. The metallic foil can be patterned using conventional wet etching techniques to produce the antenna 202. Alternatively, the antenna 202 can be formed through a milling process or through a die cutting process. Each foil may have a thickness in the range of about 0.5 micrometers or about 1 micrometer to about 100 micrometers or to about 200 micrometers.

According to one example, the antenna 202 can be configured to have a resonance frequency of about 13 MHz (e.g., 13.56 MHz to 14.5 MHz) as this is commonly used in NFC. It has been found that, in some embodiments, a desired resonance frequency of a reduced-reactance antenna can be achieved by including one or more stand-alone capacitors (e.g., capacitor 206) connected in parallel with the antenna and arranged in parallel with IC 204. The frequency band at about 13.56 MHz is within a range sometimes referred to as a high frequency (HF) band. The circuit 200 of the present description can have resonance frequencies in other bands. Suitable bands include, for example, the high frequency (HF) band from 3-30 MHz and the low frequency (LF) band from 120-150 kHz and the ultra-high frequency (UHF) bands at about 433 MHz, or 865-868 MHz, or 902-928 MHz. Suitable bands also include, for example, other industrial, scientific, and medical (ISM) radio bands such as those having frequencies of about 6.78 MHz, 27.12 MHz, or 40.68 MHz. The antenna 202 can have a quality factor (Q factor) greater than about 35, or greater than about 40, or greater than about 45, or greater than about 50. In some embodiments, the antenna may have a Q factor in the range of about 35 to about 90.

The circuit 200 may have a resonance frequency and can communicate with transceiver or another device at or about at the resonant frequency. According to one example, the circuit 200 can be configured to operate according any RFID standard, such as ISO/IEC 18092, ECMA-340, or ECMA-352, for example. Other suitable standards include ISO/IEC 15693, ISO/IEC 14443, ISO/IEC 18000-3, or NFC Forum specifications.

The IC 204 can comprise a micro-chip according to one example configured to store at least a first data such as instructions. The IC 204 can be configured to communicate with other external devices and/or sensor(s) as previously described. In some examples the IC 204 can communicate with a data storage device (not shown) embedded with or otherwise coupled to the bonded abrasive wheel. The IC 204 may have an effective capacitance less than about 1000 pF, or less than about 500 pF, or less than about 200 pF, or less than about 150 pF, or less than about 100 pF, or less than about 50 pF, and may have an effective capacitance greater than 1 pF or greater than 5 pF.

Regarding the capacitor 206, this can comprise one or more stand-alone capacitors that can be electrically connected in parallel with the antenna 202 and the IC 204. The capacitor 206 can have an equivalent capacitance greater than about 10 pF, or greater than about 100 pF, or greater than about 500 pF, or greater than about 1 nF, or greater than about 2 nF, and may have an equivalent capacitance less than about 1 µF or less than about 10 µF. The capacitor 206 can have an equivalent first capacitance and may include a single capacitor having the first capacitance or may include a plurality of capacitors electrically connected to provide an equivalent capacitance equal to the first capacitance, which can, for example, be in the ranges discussed previously. If a plurality of capacitors are included, the capacitors may be electrically connected together in any suitable way. In some embodiments, the plurality of capacitors may be connected in parallel, or in series, or a combination of parallel and series connections may be used.

The circuit 200 of the present description may be adapted to minimize an effect due to a local parasitic capacitance. The circuit 200 can be so adapted, for example, by limiting the number of loops of the antenna (for example, to the almost one loop shown (although further loops such as 2, 3, etc. are contemplated in other examples), using an antenna 202 having a sufficiently large cross-sectional area, and/or by including an appropriate stand-alone capacitor or a plurality of stand-alone capacitors (capacitor 204) to provide a desired resonant frequency. In some examples, the IC 204 may have an effective capacitance and the capacitor 206 may have an equivalent first capacitance. A parallel sum of the effective capacitance and the first capacitance may be at least 4, or at least 7, or at least 10, or at least 12 times the maximum local parasitic capacitance. In some examples, the equivalent capacitance is at least 3 times, or at least 3.5 times, or at least 4 times, or at least 5 times the maximum local parasitic capacitance. In some embodiments, the equivalent capacitance of the capacitor 206 is in a range of 3 times to 1000 times the maximum local parasitic capacitance.

Further circuits constructs are disclosed in United States Patent Application Publication No. 2018/0068214, entitled "RADIO FREQUENCY IDENTIFICATION TAG", which is co-owned by the Applicant, the entire disclosure of which is incorporated by reference in its entirety.

FIG. 3 shows a circuit 300 constructed in the manner of the circuit 200 have that the antenna 302 of the circuit 300 comprises a wire 304 having a circular cross-section as shown in FIG. 3A. The wire 304 can be constructed of a metallic material, for example, such as copper, aluminum, alloys thereof or the like. The diameter of the wire 304 can be in the range of about 5 mils in diameter to 250 mils. The wire 304 in some examples can be wound into a coil to form a geometry comprising at least about one loop of wire (similar to FIG. 2), several loops of wire, or up to hundreds or thousands of loops as desired. Wire 304 can be inductor wire or magnet wire, for example. Wire 304 in some cases can comprise enameled copper (enameled for insulation between turns/loops).

FIG. 4 shows a portion of a circuit 400 (e.g., circuit 200 or circuit 300) where the antenna 402 (e.g., antenna 202 or antenna 302) has a first side that can be positioned on or closely adjacent a first backing 404. The circuit 400 additionally can include a second backing 406 positioned on or closely adjacent a second opposing side of the antenna 402. As such, the antenna 402 can be sandwiched between the first backing 404 and the second backing 406. The first backing 404 and/or second backing 406 can act to support the antenna 402. Backing thickness can be between 0.001 inch and 0.02 inches, for example. The backing can be constructed of elastomeric polyurethane, co-polyester, polyimide, polysulfide, silicone, polyether block amide films, epoxies, other urethanes, polybenzimidazole, polysulfone (PSU), poly(ethersulfone) (PES) and polyetherimide (PEI), poly(phenylene sulfide) (PPS), polyetheretherketone (PEEK), polyether ketones (PEK), or fluoropolymers.

Figure 5A:
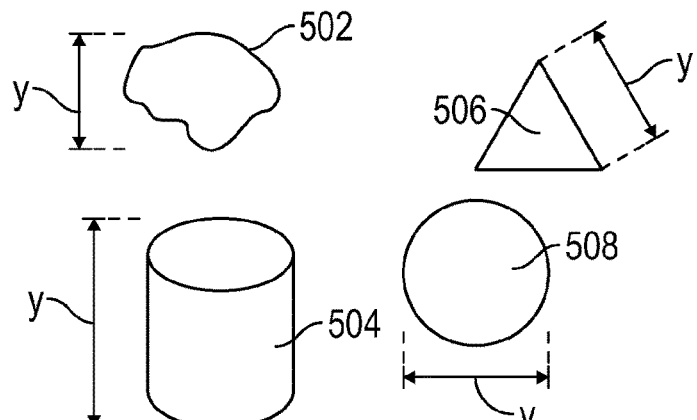
FIG. 5A is a schematic view showing several types of abrasive particles with a major dimension indicated with a dimension Y, in accordance with one example of the present application.

FIG. 5 shows the circuit 200 of FIG. 2 with the width 216 as compared to a largest dimension (indicated as Y) of various types of abrasive particles 502, 504, 506 and 508. Abrasive particle 502 comprises a crushed particle. Abrasive particles 504, 506 and 508 are shaped particles (e.g., particle 504 is a rod, 506 is a truncated pyramid, and 508 is a circle. As shown in FIGS. 5 and 5A, a ratio of the width 216 of the antenna 200 to the largest dimension or a largest average dimension of the plurality of abrasive particles 502, 504, 506 and 508 is at least 1.1 to 1 or at least 1.2 to 1, at least 1.5 to 1, or at least 2 to 1. This ratio or a greater ratio reduces the likelihood of one of the plurality of abrasive particles 502, 504, 506 and 508 being pressed through and completely severing the antenna 202 during the forming process of the bonded abrasive wheel.

Figure 6:
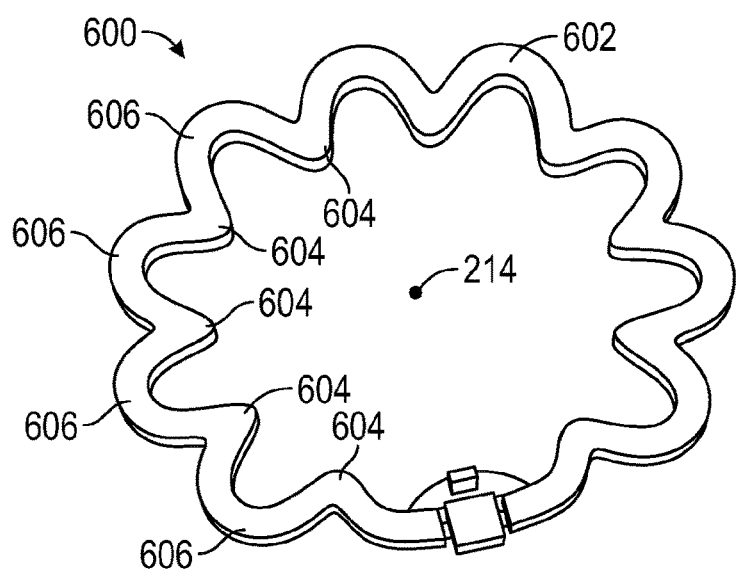
FIGS. 6 and 7 show alternative circuit configurations that utilize antennas having a variable extent about an axis of symmetry such that a first one or more portions of the antenna are disposed relatively closer to the axis than a second one or more portions of the antenna, in accordance with examples of the present application.
Figure 7:
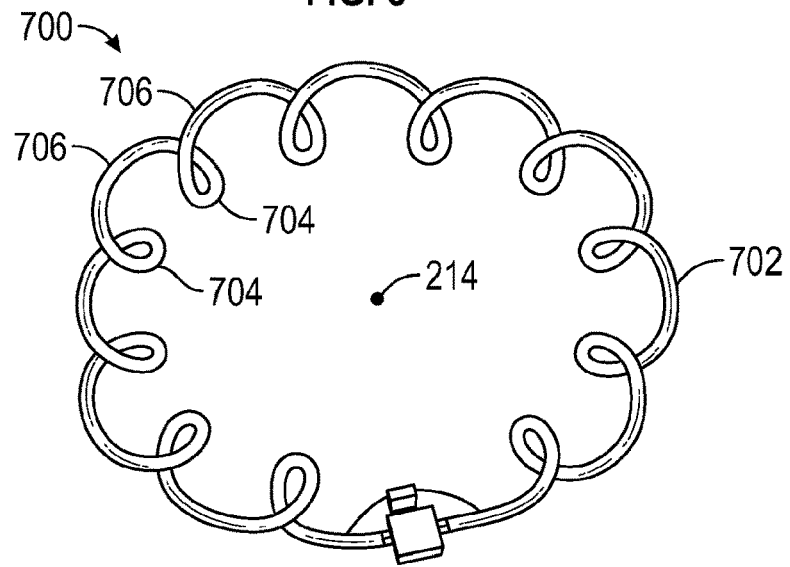

FIGS. 6 and 7 show example circuits 600 and 700, respectively. These circuits 600, 700 can be constructed in the manner of the circuits 200, 300 and 400 previously described but differ in that they can include differently shaped antennas 602 and 702. In particular, the antenna 602 of FIG. 6 can have a variable extent about the axis 214 such that a first one or more portions 604 of the antenna are disposed relatively closer to the axis 214 than a second one or more portions of the antenna 606. Similarly, the antenna 702 can have a variable extent about the axis 214 such that a first one or more portions 704 of the antenna 702 are disposed relatively closer to the axis 214 than a second one or more portions 706 of the antenna 702. The antenna 702 differs from antenna 602 in that the antenna 702 is variable extent relative to the axis 214 in three-dimensions while the antenna 602 is variable predominantly in extent in only two-dimensions.

The construction of the antennas 602 and 702 shown is exemplary and other shapes are contemplated. Shaping the antenna to have a variable extent can be provided to enable some yield due to the shape in anticipation of deformation that can occur during the forming process of the bonded abrasive wheel.

FIG. 8A shows another example of a circuit 800 similar to that of circuit 200 of FIGS. 2 and 2A. However, the circuit 800 differs in that it does not include the capacitor 206 of FIGS. 2 and 2A and further includes an encapsulation 803 around IC 804. In some examples, it should be recognized that the capacitor 206 can be enclosed within the encapsulation 803 along with the IC. The encapsulation 803 can also surround the solder 808 (leads not specifically shown) and portions of the antenna 802. The encapsulation 803 can comprise a material having a modulus of greater than about 0.25 MPa but less than about 125 GPa, the greater than about 0.25 MPa but less than about 10 Gpa, or greater than about 0.25 MPa but less than about 2.5 Gpa are contemplated. The material can comprise an epoxy such as 3M™ Scotch-Weld™ Epoxy Adhesive DP100 silicones, urethanes, epoxy resins, fluoropolymers. Silicone epoxy is also contemplated for the material including Duralco™ 4460 or RESBOND™ 919.

FIGS. 8B and 8C show the circuit 800 of FIG. 8A embedded within a bonded abrasive wheel 810. FIG. 8B also illustrates a region 812 adjacent and around at least an antenna 802 that can contain a second plurality of abrasive particles that differ in construction from the first plurality of abrasive particles that make up other regions of the bonded abrasive wheel 810 such as along and adjacent the grinding surface 814. These second plurality of abrasive particles (e.g., Norland Optical Adhesives: NOA 72, NOA 73, NOA 74, NOA 75, NOA 76) can comprise particles that are smaller and/or particles having less edges or less sharp edges relative to the first plurality of abrasive particles. The region 812 in other examples can be provided with a filler material (previously described in FIGS. 1A and 1B) rather than the abrasive particles. FIG. 8C also illustrated a bushing 816. Similar to the bushing 192, the bushing 816 can be comprised of a non-metallic material (e.g., a polymer), for example. In other examples the bushing 816 can be split and/or may not extend entirely through the bonded abrasive wheel 810.

FIGS. 9 and 9A show a circuit 900 similar to that of the prior circuits previously discussed save that the circuit 900 has an antenna 902 comprises a mesh 904. As shown in FIG. 9A, the mesh 904 can have a plurality of openings 906. Each of the plurality of openings 906 being defined between a plurality of strands 908 of the mesh 904. A total area of all of the plurality of openings 906 is between 5 times and 20 times smaller than a central opening 910 defined by the antenna 902 having the radius of curvature. Total area of plurality of openings can be between 5 times and 50 times smaller than the central opening 910, or between 5 and 200 times smaller, or between 5 and 500 times smaller Alternatively, according to further embodiments a dimension of the plurality of openings 906 to width 216 (FIG. 2) can be between 2 times and 10 times smaller than the width 216, or 2 times and 20 times smaller, or about 2 times and 100 times smaller. The mesh 904 can act as a scrim for the bonded abrasive wheel 912 of FIG. 9 in operation to provide support to the curable composition of the abrasive particles and the binder. The size of each of the plurality of openings 906 can be about 100 micrometers to about 2 mm, or about 100 micrometers to about 5 mm, for example.

Figure 10:
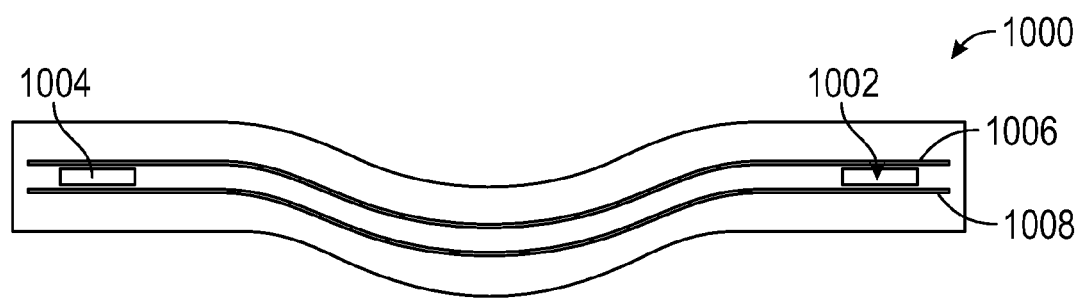
FIG. 10 is a side schematic cross-sectional view of another example grinding wheel including a circuit positioned between a first scrim and a second scrim, in accordance with one example of the present application.

FIG. 10 shows another bonded abrasive wheel 1000 construct with a circuit 1002 having an antenna 1004. The bonded abrasive wheel 1000 can include a first scrim 1006 disposed in close proximity (abutting or slightly spaced from) a first side of the antenna 1004. The bonded abrasive wheel 1000 can include a second scrim 1008, disposed in close proximity (abutting or slightly spaced from) a second side of the antenna 1004. In this manner the first scrim 1006 and the second scrim 1008 can sandwich at least the antenna 1004 and in some cases all of the circuit 1002.

Figure 11:
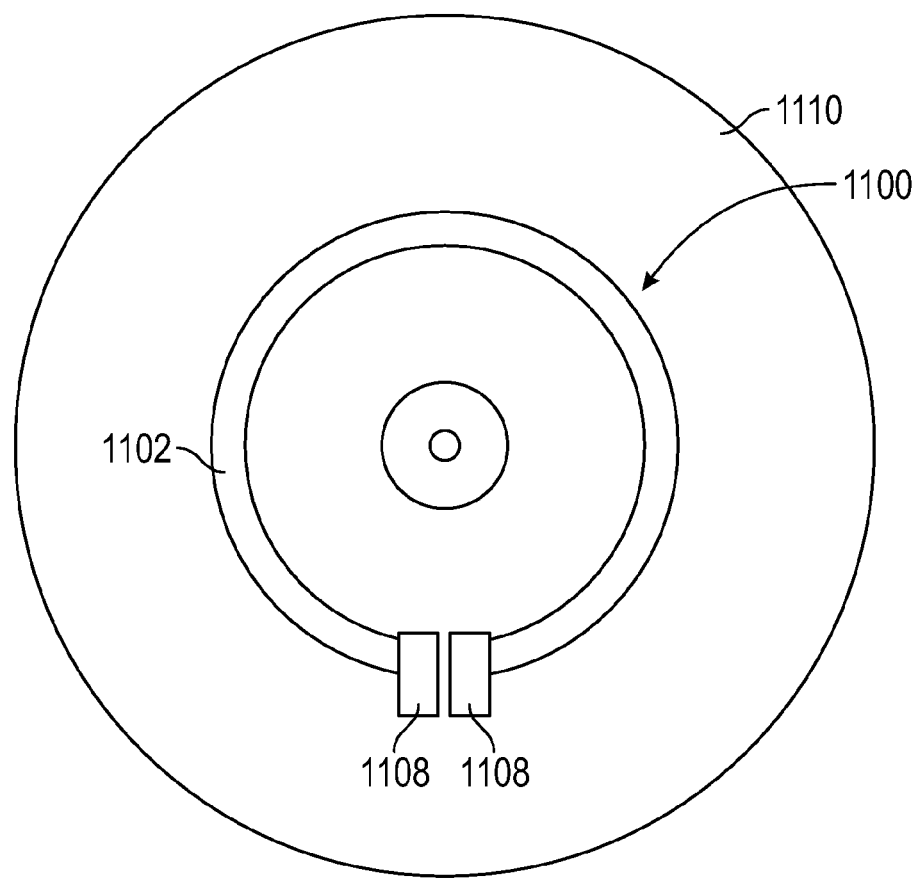
FIG. 11 is a top schematic cross-sectional view of another example of a circuit that includes an embedded antenna but an integrated circuit that is mounted to or above either a grinding surface or a surface opposing the grinding surface, in accordance with one example of the present application.
Figure 11A:
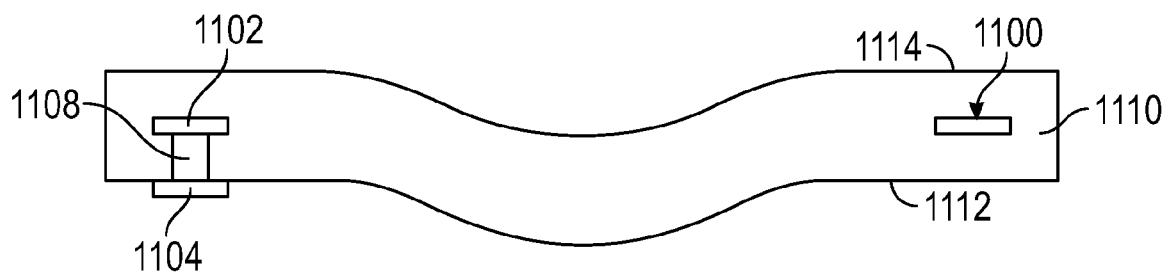
FIG. 11A is a side schematic cross-sectional view of the circuit of FIG. 11.
Figure 12:
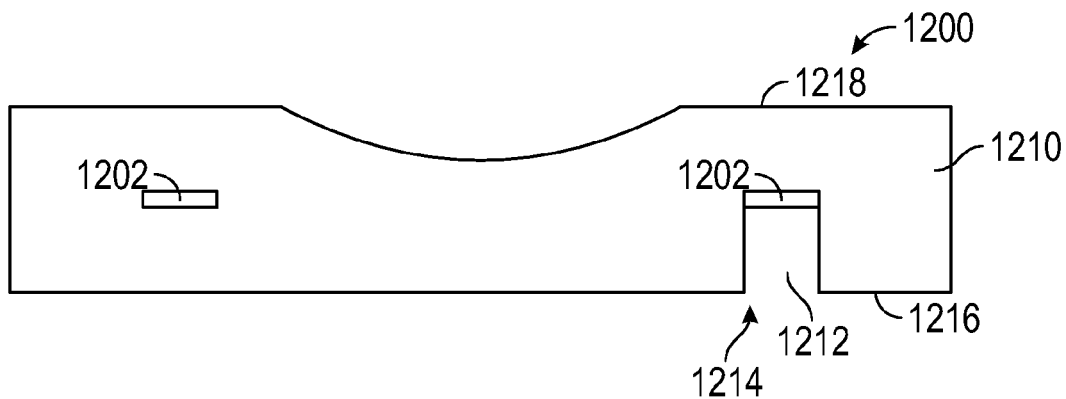
FIG. 12 is a side schematic cross-sectional view of another circuit and a bonded abrasive wheel where leads and an integrated circuit are added to the circuit in an assembly plug (shown in FIGS. 12A and 12B) insertable into an opening in the bonded abrasive wheel, in accordance with one example of the present application.

FIGS. 11-12C show examples of circuits that have portions of the circuit (e.g., the IC and/or leads) added after the forming of the abrasive wheels. FIGS. 11 and 11A show an embodiment of a circuit 1100 where the leads 1108 extend in a direction substantially perpendicular to an antenna 1102. It should be noted in the example of FIGS. 11 and 11A, components such as the leads 1108 and IC 1104 are not drawn to scale but are exaggerated in size for viewer understanding. The antenna 1102 can be embedded in a bonded abrasive wheel 1110 and the leads can extend through the abrasive wheel 1110 such as to a back surface 1112 (FIG. 11A) thereof or an abrading surface 1114 (FIG. 11A) thereof. The IC 1104 can be added to the circuit 1100 by electrical connection to the leads 1108 after the forming of the bonded abrasive wheel 1110. According to the example of FIGS. 11 and 11A, the IC 1104 can be disposed on or adjacent the back surface 1112 (FIG. 11A), for example.

Figure 12A:
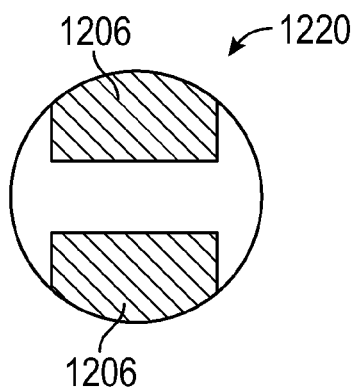
FIGS. 12A and 12B are schematic views of the assembly plug that can be utilized with the circuit and bonded abrasive wheel of FIG. 12, in accordance with one example of the present application.
Figure 12B:
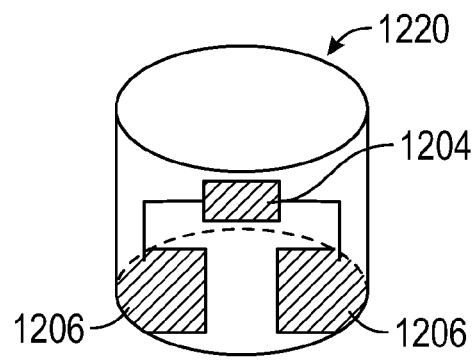

FIG. 12 shows another example of a circuit 1200 and a bonded abrasive wheel 1210. In FIG. 12, the portion of the circuit 1200 embedded in the bonded abrasive wheel 1210 again comprises the antenna 1202. However, in FIG. 12, the bonded abrasive wheel 1210 includes a recess 1212 with an opening 1214 to either a back surface 1216 or an abrading surface 1218 of the bonded abrasive wheel 1210. As shown in FIGS. 12A and 12B, a plug 1220 containing an IC 1204 (FIG. 12B) and electrical connection pads 1206 can be configured to insert into the recess 1212 and make electrical contact with the antenna 1202 after forming of the bonded abrasive wheel 1210.

Figure 13:
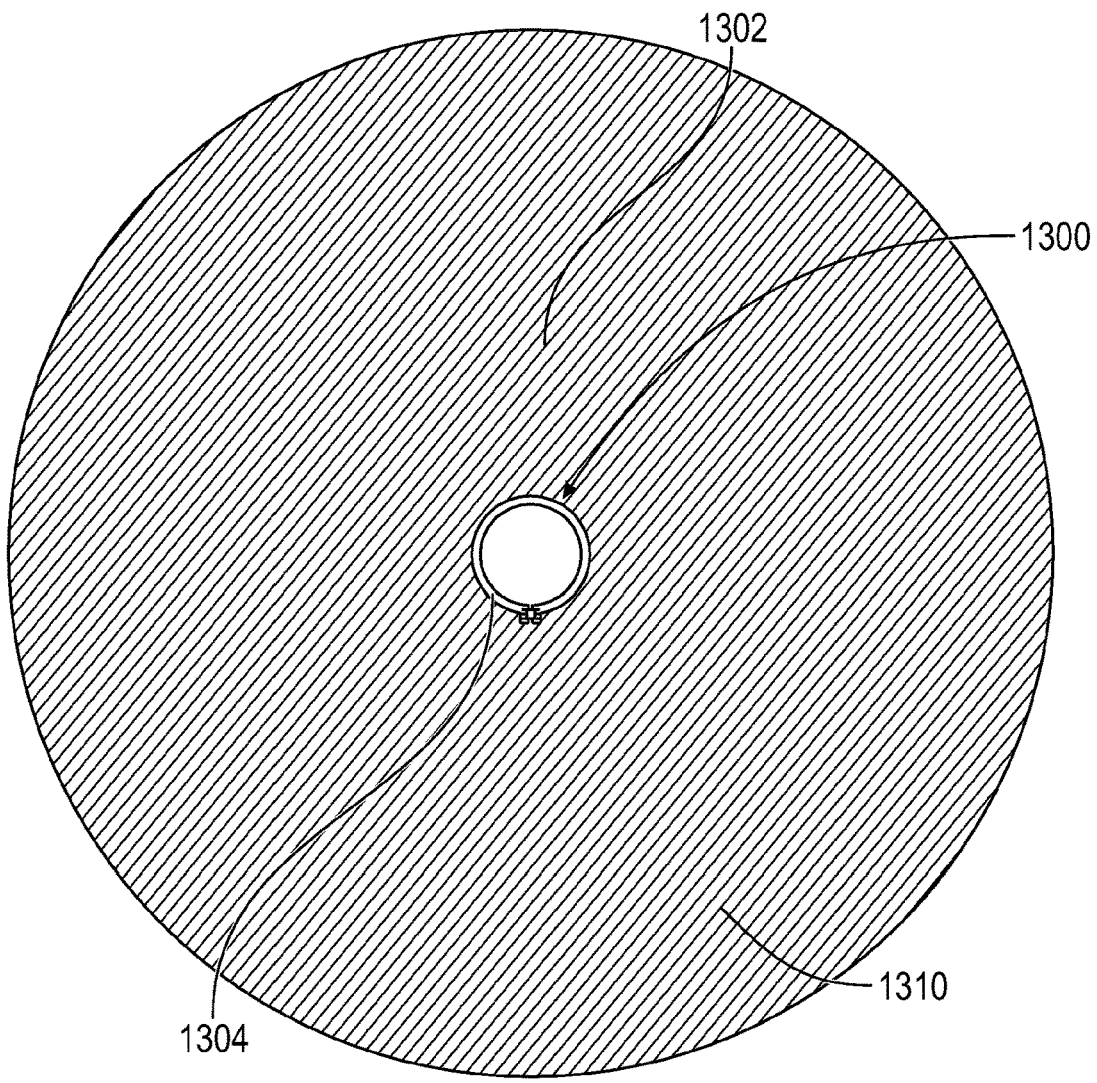
FIG. 13 is top schematic cross-sectional view of another example of a circuit that comprises a bushing for a bonded abrasive wheel, in accordance with one example of the present application.
Figure 13A:
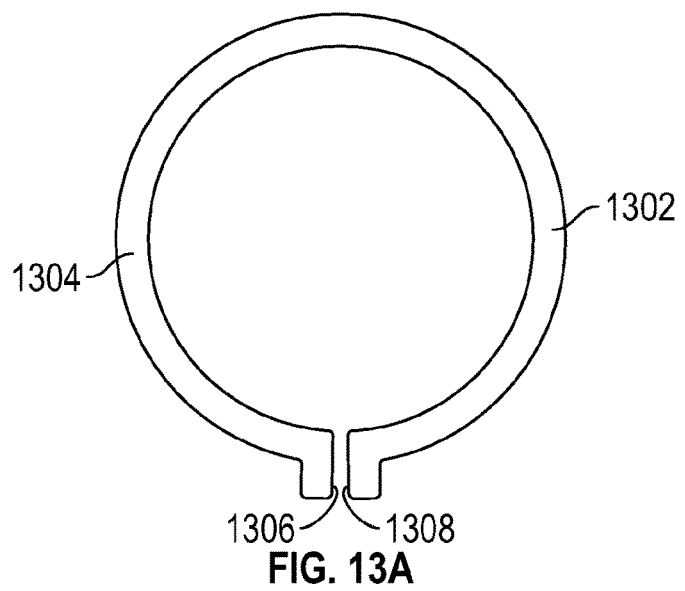
FIG. 13A is an enlarged view of the bushing of FIG. 13.

FIGS. 13 and 13A show an example circuit 1300 such as those previously described where an antenna 1302 of the circuit 1300 is configured to act as a bushing 1304 for a bonded abrasive wheel 1310 (FIG. 13 only). As shown in FIG. 13, a small gap between a first end 1306 and a second end 1308 of the antenna 1302 can remain as previously described in the example of FIGS. 2 and 2A. In some cases, the gap may be filled with a non-signal interfering material, e.g., a polymer or the like. As shown in FIGS. 13 and 13A, the IC can be placed in the gap between the first end 1306 and the second end 1308.

FIG. 14 shows a portion of a method 1400 of forming a bonded abrasive wheel 1401 with a circuit 1402 embedded therein. Related methods of forming the bonded abrasive wheel 1401 have been previously discussed with reference to FIGS. 1A and 1B. The method 1400 includes a mold 1404 having a circular mold cavity 1405 with a central portion 1407 (reference FIG. 16) configured to create to a central hub. The mold 1404 includes sidewalls 1406 and a baseplate 1408. The central mold cavity 1405 can have an outer circumference defined by the sidewalls 1406. The method 1400 can include placing one or more scrims (scrims 1434) on the baseplate 1408. As shown in FIG. 14, the method 1400 includes positioning a first layer 1412 of a first curable composition 1414 into the mold 1404. The first curable composition 1414 can comprise abrasive particles dispersed in a binder precursor as previously illustrated and discussed in reference to FIGS. 1A and 1B.

As shown in FIG. 14, the method 1400 can include forming at least a first recess 1418 in the first layer 1412 of the first curable composition 1414. The method 1400 can further include positioning the circuit 1402 (including antenna 1422 and IC 1424 shown in FIG. 14) within the mold 1404 on the first layer 1412 of the first curable composition 1414. The positioning can include positioning the IC 1424 within the at least first recess 1418.

The method 1400 can include positioning a second layer 1430 of the first curable composition 1414 (or a second curable composition with a different binder precursor or different type of abrasive particles) into the mold 1404 on the first layer 1412 and the circuit 1402 such that the circuit 1402 can be received between the first layer 1412 and the second layer 1430. The method 1400 can include at least partially curing the first curable composition 1414 to provide the bonded abrasive wheel 1401. In some examples (such as in FIG. 14) one or more scrims, backings, etc. 1434 can be positioned in the mold 1404 such as been the first layer 1412 and the second layer 1430 prior to various of the method steps discussed above including the at least partial curing.

As previously discussed, in some example methods a filler and/or a different plurality of abrasive particles (e.g., smaller particles, particles have less cutting edges or less sharp cutting edges) can be positioned in the mold 1404 adjacent and around the circuit 1402. (Reference FIGS. 8B and 8C). According to further example methods, the plurality of scrims 1434 can include one or more scrims disposed to abut or be closely adjacent the circuit 1402. In the case of two scrims, these can be positioned so as to sandwich the circuit 1402 therebetween. (Reference FIG. 10). Furthermore, according to some methods, as previously discussed in reference to FIGS. 9 and 9A, in some examples the antenna 1402 can be configured as a mesh antenna. Thus, one of the plurality of scrims 1434 such as the one shown between the first layer 1412 and the second layer 1430 need not be provided as the antenna 1402 with the mesh construct can act as a scrim.

It is to be recognized that depending on the example, certain acts or events of any of the techniques described herein can be performed in a different sequence, can be added, merged, or left out altogether (e.g., not all described acts or events are necessary for the practice of the techniques). Moreover, in certain examples, acts or events can be performed concurrently, e.g., through multi-threaded processing, interrupt processing, or multiple processors, rather than sequentially.

In one or more examples, the functions described can be implemented in hardware, software, firmware, or any combination thereof, located locally or remotely. If implemented in software, the functions can be stored on or transmitted over a computer-readable medium as one or more instructions or code and executed by a hardware-based processing unit. Computer-readable media can include computer-readable storage media, which corresponds to a tangible medium such as data storage media, or communication media including any medium that facilitates transfer of a computer program from one place to another, e.g., according to a communication protocol. In this manner, computer-readable media generally can correspond to (1) tangible computer-readable storage media which is non-transitory or (2) a communication medium such as a signal or carrier wave. Data storage media can be any available media that can be accessed by one or more computers or one or more processors to retrieve instructions, code and/or data structures for implementation of the techniques described in this disclosure. A computer program product can include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions can be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein can refer to any of the foregoing structures or any other structure suitable for implementation of the techniques described herein. In addition, in some aspects, the functionality described herein can be provided within dedicated hardware and/or software modules. Also, the techniques could be fully implemented in one or more circuits or logic elements.

The techniques of this disclosure can be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units can be combined in a hardware unit or provided by a collection of interoperative hardware units, including one or more processors as described above, in conjunction with suitable software and/or firmware.

The functions, techniques or algorithms described herein may be implemented in software in one example. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the examples described are merely examples. The software may be executed on a digital signal processor, ASIC, microprocessor, or other type of processor operating on a computer system, such as a personal computer, server or other computer system, turning such computer system into a specifically programmed machine Various examples have been described. These and other examples are within the scope of the following claims.

As used herein:

The term "a", "an", and "the" are used interchangeably with "at least one" to mean one or more of the elements being described.

The term "and/or" means either or both. For example, "A and/or B" means only A, only B, or both A and B.

The terms "including," "comprising," or "having," and variations thereof, are meant to encompass the items listed thereafter and equivalents thereof as well as additional items. The term "adjacent" refers to the relative position of two elements, such as, for example, two layers, that are close to each other and may or may not be necessarily in contact with each other or that may have one or more layers separating the two elements as understood by the context in which "adjacent" appears.

All scientific and technical terms used herein have meanings commonly used in the art unless otherwise specified. The definitions provided herein are to facilitate understanding of certain terms used frequently in this application and are not meant to exclude a reasonable interpretation of those terms in the context of the present disclosure.

Unless otherwise indicated, all numbers in the description and the claims expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviations found in their respective testing measurements.

The term "substantially" or "about" means within 20 percent (in some cases within 15 percent, in yet other cases within 10 percent, and in yet other cases within 5 percent) of the attribute being referred to. Thus, a value A is "substantially similar" to a value B if the value A is within plus/minus one or more of 5%, 10%, 20% of the value A.

Features and advantages of the present disclosure will be further understood upon consideration of the detailed description as well as the appended claims.

The recitation of numerical ranges by endpoints includes all numbers subsumed within that range (e.g. a range from 1 to 5 includes, for instance, 1, 1.5, 2, 2.75, 3, 3.80, 4, and 5) and any range within that range.

The term "central hub" refers to the central region of a bonded abrasive wheel that engages and/or contacts a rotatable shaft of a power tool in normal usage. Examples include an arbor hole, an arbor hole lined with a sleeve, grommet or rivet, an arbor hole filled having an insert therein, and a mechanical fastener centrally adhered to the bonded abrasive wheel. The term "ceramic" refers to any of various hard, brittle, heat- and corrosion-resistant materials made of at least one metallic element (which may include silicon) combined with oxygen, carbon, nitrogen, or sulfur.

The term "rotational axis" is reference to a bonded abrasive wheel refers to the axis around which the wheel is rotated during normal usage to abrade a workpiece.

The term "major dimension" refers to the longest dimension of an object.

Although the present disclosure has been described with reference to preferred embodiments, workers skilled in the art will recognize that changes can be made in form and detail without departing from the spirit and scope of the present disclosure.

VARIOUS NOTES & EXAMPLES

The disclosure herein includes but is not limited to the following illustrative Examples:

Example 1 is a bonded abrasive wheel that can optionally comprise: a plurality of abrasive particles disposed in a binder; a first grinding surface; a second surface opposing the first grinding surface; an outer circumference; a rotational axis extending through a central hub; and a circuit configured as a Radio Frequency Identification (RFID) unit coupled to the abrasive wheel, wherein the circuit optionally can comprise: an antenna configured to communicate with one or more external devices and comprising a first end and a second end, wherein antenna has a radius of curvature about an axis along at least a portion thereof such that the first end is disposed adjacent to but is spaced from the second end, and an integrated circuit (IC) operably coupled to the antenna and configured to store at least a first data.

Example 2 is the abrasive wheel of Example 1, wherein the antenna optionally comprises a single non-complete loop between the first end and the second end and is embedded within the abrasive wheel so as to be spaced from the first grinding surface.

Example 3 is the abrasive wheel of Example 2, wherein the antenna can be spaced away from either the first grinding surface or the second surface by between 0.1% and 200% percent of the radius of curvature of the antenna.

Example 4 is the abrasive wheel of any one or combination of Examples 1-3, wherein the integrated circuit is optionally one of: positioned within the abrasive wheel or positioned at the second surface, and wherein the leads extend into the bonded abrasive wheel from the integrated circuit to electrically connect to the antenna that is embedded within the bonded abrasive wheel.

Example 5 is the abrasive wheel of any one or combination of Examples 1-4, further optionally comprising one or more capacitors operably coupled the antenna in parallel with the IC.

Example 6 is the abrasive wheel of any one or combination of Examples 1-5, further optionally comprising one or more sensors coupled to the abrasive wheel and an abrading tool configured to drive the abrasive wheel, and wherein: the first data includes data received from the one or more sensors, and the circuit is configured to communicate data, including the at least first data, regarding the abrasive wheel received from the one or more sensors, and the abrading tool comprises a data storage unit configured to store a second data based at least in part on the at least first data.

Example 7 is the abrasive wheel of any one or combination of Examples 1-6, wherein the integrated circuit can be encapsulated within a material having a modulus of greater than 0.25 MPa but less than 125 GPa.

Example 8 is the abrasive wheel of any one or combination of Examples 1-7, wherein a ratio of a width of the antenna to a longest dimension of the plurality of abrasive particles can be at least 1.1 to 1.

Example 9 is the abrasive wheel of any one or combination of Examples 1-8, wherein the antenna can comprise a mesh having a plurality of openings, each of the plurality of openings being defined between a plurality of strands of the mesh.

Example 10 is the abrasive wheel of Example 9, wherein a total area of all of the plurality of openings can be between 5 times and 20 times smaller than a central opening defined by the antenna having the radius of curvature.

Example 11 is the abrasive wheel of any one or combination of Examples 1-10, wherein the central hub is configured to receive a bushing, and wherein the bushing comprises one of: a non-metallic material; or the antenna.

Example 12 is the abrasive wheel of any one or combination of Examples 1-11, wherein the antenna can have a variable extent about the axis such that a first one or more portions of the antenna are disposed relatively closer to the axis than a second one or more portions of the antenna.

Example 13 is a bonded abrasive wheel that can optionally comprise:
a plurality of abrasive particles disposed in a binder; a first grinding surface; an outer circumference; a rotational axis extending through a central hub; and a circuit configured as a Radio Frequency Identification (RFID) unit coupled to the bonded abrasive wheel, wherein the circuit can optionally comprise: an antenna embedded within the bonded abrasive wheel; and an integrated circuit (IC) operably coupled to the antenna, wherein the integrated circuit is encapsulated within a material having a modulus of greater than 0.25 MPa but less than 125 GPa.

Example 14 is the abrasive wheel of Example 13, wherein the antenna can comprise a single non-complete loop between a first end and a second end, and wherein both the antenna and the IC are embedded within the abrasive wheel so as to be spaced from the first grinding surface.

Example 15 is the abrasive wheel of any one or combination of Examples 13-14, wherein the antenna can comprise a mesh having a plurality of openings, each of the plurality of openings being defined between a plurality of strands of the mesh.

Example 16 is the abrasive wheel of Example 15, wherein a total area of all of the plurality of openings can be between 5 times and 20 times smaller than a central opening defined by the antenna having the radius of curvature.

Example 17 is the abrasive wheel of any one or combination of Examples 13-16, wherein the central hub can be configured to receive a bushing, and wherein the bushing can comprise one of: a non-metallic material; or the antenna.

Example 18 is a bonded abrasive wheel that can optionally comprise:
a plurality of abrasive particles disposed in a binder; a first grinding surface; an outer circumference; a rotational axis extending through a central hub; and a circuit configured for communication coupled to the bonded abrasive wheel, wherein the circuit can optionally comprise: an antenna embedded within the bonded abrasive wheel, the antenna comprising a mesh having a plurality of openings, each of the plurality of openings being defined between a plurality of strands of the mesh, and wherein, in cross-section, wherein a total area of all of the plurality of openings is between 5 times and 20 times smaller than a central opening defined by the antenna having the radius of curvature; and an integrated circuit (IC) operably coupled to the antenna.

Example 19 is the abrasive wheel of Example 18, wherein the integrated circuit can be encapsulated within a material having a modulus of greater than 0.25 MPa but less than 125 GPa.

Example 20 is the abrasive wheel of any one or combination of Examples 18-19, wherein the antenna can comprise a single non-complete loop between a first end and a second end, and wherein both the antenna and the IC can be positioned within the abrasive wheel so as to be spaced from the first grinding surface.

Example 21 is the abrasive wheel of any of Examples 18-20, wherein the central hub can be configured to receive a bushing, and wherein the bushing can comprise one of: a non-metallic material; or the antenna.

Example 22 is a method of making a bonded abrasive wheel, the method can comprise the steps of: positioning a first layer of a first curable composition into a mold having a circular mold cavity with a central portion configured to create a central hub, wherein the circular mold cavity has an outer circumference, and wherein the first curable composition comprises abrasive particles dispersed in a binder precursor; forming a least a first recess in the first layer of the first curable composition; positioning a circuit within the mold on the first layer of the first curable composition, wherein the positioning includes positioning an integrated circuit (IC) of the circuit within the at least first recess; positioning a second layer of first curable composition into the mold on the first layer and the circuit such that the circuit is positioned between the first layer and the second layer; and at least partially curing the first curable composition to provide the bonded abrasive wheel.

Example 23 is the method of Example 22, and optionally further comprising positioning a different plurality of abrasive particles in a second curable composition in the mold adjacent and around the circuit.

Example 24 is the method of any one of Examples 22-23, and optionally further comprising positioning a plurality of scrims in the mold to abut or be closely adjacent at least a portion of the circuit.

Example 25 is the method of any one of Examples 22-24, wherein the circuit can have an antenna comprising a mesh having a plurality of openings, each of the plurality of openings being defined between a plurality of strands of the mesh, wherein the mesh is configured to act as a scrim.

WORKING EXAMPLES

Unless otherwise noted, all parts, percentages, ratios, etc. in the Examples and the rest of the specification are by weight.

TABLE 1

| ABBRE-VIATION | DESCRIPTION |
|---|---|
| PAF | POTASSIUM FLUOROALUMINATE, PARTICLE SIZE DISTRIBUTION $D_{10}$ = 2.58 MICROMETERS, $D_{50}$ = 11.5 MICROMETERS, $D_{90}$ = 36.6 MICROMETERS, FROM KBM AFFLIPS B. V., OSS, THE NETHERLANDS. |
| PRL | LIQUID PHENOLIC RESIN, AVAILABLE AS DYNEA 5136G FROM DYNEA OY CORPORATION, HELSINKI, FINLAND. |
| PRP | PHENOLIC RESIN POWDER, AVAILABLE AS VARCUM 29302 FROM DUREZ CORPORATION, DALLAS, TEXAS. |
| PMIX | 50:50 BLEND OF PAF AND PRP MIXED IN A V-BLENDER FOR 3 HOURS. |
| SAP1 | SHAPED ABRASIVE PARTICLES WERE PREPARED ACCORDING TO THE DISCLOSURE OF U.S. Pat. No. 8,142,531 (ADEFRIS ET AL). THE SHAPED ABRASIVE PARTICLES WERE PREPARED BY MOLDING ALUMINA SOL GEL IN EQUILATERAL TRIANGLE-SHAPED POLYPROPYLENE MOLD CAVITIES. AFTER DRYING AND FIRING, THE RESULTING SHAPED ABRASIVE PARTICLES WERE ABOUT 1.4 MM (SIDE LENGTH) × 0.35 MM (THICKNESS), WITH A DRAFT ANGLE APPROXIMATELY 98 DEGREES. |
| SCRIM1 | FIBERGLASS MESH OBTAINED AS STYLE 4400 FROM INDUSTRIAL POLYMER AND CHEMICALS, INC., SHREWSBURY, MASSACHUSETTS. |
| SCRIM2 | FIBERGLASS MESH FROM TISSA GLASWEBEREI AG, OBERKULM, SWITZERLAND. |
| SCRIM3 | FIBERGLASS MESH, OBTAINED AS "RXO 08-125 X 23 MM", TRIMMED TO 114 MM OUTSIDE DIAMETER FROM RYMATEX SP. ZO.O., RYMANOW, POLAND |

Example 1

Preparation of NFC CIRCUIT NFC1—Free Standing Circuit with 2 mil Cu

Figure 15:
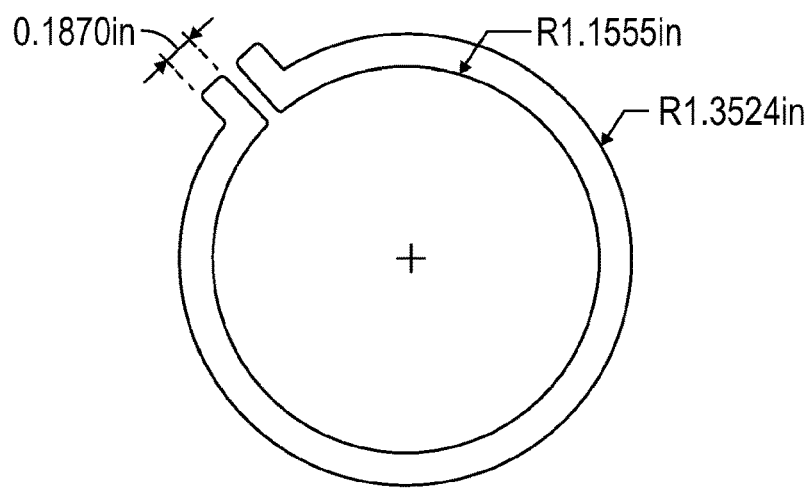
FIG. 15 shows an example of an antenna that is used in accordance with the Working Example.

NFC circuit NFC 1 was created using as a single loop antenna as shown in FIG. 15 using free-standing Cu foil. A 2 mil thick Cu film on a paper liner was die cut using a rotary die tool (Obtained from Wilson Manufacturing St. Louis, Mo.). Dimensions of the antenna are shown in FIG. 15. An NFC chip (NXP Semiconductors NTAGI2C, obtained from Digi-Key Electronics, Thief River Falls, Minn.) and the capacitor chip (ceramic chip capacitor, 1000 picofarads, size 0603 (1608 metric), temperature coefficient NP0/COG (obtained from Digi-Key Electronics, Thief River Falls, Minn.) was soldered across the gap. The chip and the capacitor were encapsulated by a droplet of NOA 76 (Norland Optical Adhesive Inc., Cranbury, N.J.).

Preparation of NFC CIRCUIT NFC2—Free Standing Circuit with 1 mil Cu

NFC circuit NFC 2 was created using as a single loop antenna using free-standing Cu foil. A 1 mil thick Cu film (obtained as 1245 Foil Tape, 3M Company, St. Paul, Minn.) on a paper liner was die cut using a rotary die tool (obtained from Wilson Manufacturing St. Louis, Mo.). The inner and outer radius of the antenna loop was 2.9 and 3.4 cm (again reference FIG. 15), respectively. The dimensions of the antenna are shown in FIG. 15. The NFC chip (NXP Semiconductors NTAGI2C, obtained from Digi-Key Electronics, Thief River Falls, Minn.)) and the capacitor chip (0603 1000 pF) was soldered across the gap in the single loop antenna. The chip and the capacitor were encapsulated by a blob of NOA 76 (Norland Optical Adhesive Inc., Cranbury, N.J.).

Preparation of NFC CIRCUIT NFC3-Circuit on Polyimide Substrate

The NFC circuit NFC3 was created on a polyimide substrate. First, a resist was printed (ink from Cartridge-Free ColorQube® Ink, 8570 Series", part 108R00930, Xerox Corporation, Norwalk, Conn.) on Cu/polyimide film (Espanex Polyimide Laminate, part number MC 18-25-00 FRM, 18 um Cu/1 mil polyimide obtained from Electro-Materials, Inc., Eagan Minn.)) using a wax printer (obtained as Xerox ColorQube 8570DN, from Xerox Corporation, Norwalk, Conn.). The substrate was then immersed in Cu etchant solution (MG-Chemicals 415-4L, obtained from Mouser Electronics, Mansfield, Tex.) to remove areas of Cu that are not protected by the resist. The resist was then washed away using methyl ethyl ketone (MEK). This completed the creation of a multiloop Cu NFC antenna (#loops—10, Cu trace width and pitch is 500 um, respectively). The NFC chip (a NXP Semiconductors NTAGI2C, obtained from Digi-Key Electronics, Thief River Falls, Minn.)) and the tuning capacitor chip is then soldered onto the etched Cu pads. The jumper connecting the inside to the outside of the antenna loop (without shorting the other loop traces) is created by applying a piece of polyimide tape (tape 5413, obtained from 3M Company, St. Paul, Minn.) as the insulation material and then soldering a sheathed conductor cable across at the starting and finishing point of the antenna loop. The chip and the tuning capacitor are encapsulated usingepoxy (DP-100, obtained from 3M Company, St. Paul, Minn.).

Preparation of MIX1

The mix was prepared according to the composition listed in Table 2. The mix was prepared by first mixing SAP1 with PRL for 7 minutes in a paddle mixer, then the PMIX powder blend was added and mixed for 7 additional minutes.

TABLE 2

| Component | Amount, grams MIX1 |
|---|---|
| SAP1 | 720 |
| PMIX | 225 |
| PRL | 55 |

Example 1

A Type 27 depressed-center composite grinding wheel was prepared as follows. A 4.5-inch (11.4 cm) diameter disc of SCRIM1 was placed into a 4.5-inch diameter (11.4-cm) mold made of hardened steel having the central portion 1407 previously discussed in reference to FIG. 14. 75 grams of MIX1 was spread out evenly and a 4.5-inch (11.4-cm) disc of SCRIM3 was placed on top of the mix 1. The NFC circuit NFC1 was placed and centered inside the mold as shown in FIG. 16. A second 4.5-inch (11.4-cm) disc of SCRIM3 was placed on top of the NFC1. Another 75 grams of Mix 1 was spread out evenly on the third scrim. A 3-inch (7.6-cm) SCRIM2 disc was inserted and centered into the cavity. The filled cavity mold was then pressed at a pressure of 30 tons.

The resulting wheel was removed from the cavity mold and placed on a spindle between depressed-center aluminum plates and pressed at 5 tons to give the wheel a Type 27 depressed-center shape. The wheel was then placed in an oven to cure for 7 hours at 79° C., 3 hours at 107° C., 18 hours at 185° C., and a temperature ramp-down over 4 hours to 27° C. The dimensions of the final grinding wheel were 114.3 mm diameter×6.35 mm thickness. The center hole was ⅞ inch (2.2 cm) in diameter.

The resonance of the NFC chip, capacitor, and antenna assembly was measured wirelessly with a portable vector network analyzer (miniVNA PRO, http://miniradiosolutions.com/minivna-pro/) and accompanying readout software (vna/J http://vnaj.dl2sba.com), with a near-field antenna (custom-fabricated circular antenna with 2 loops of copper on FR4 substrate having about 50 mm average antenna diameter with an SMA termination). Recording the reflected real part of impedance allowed resonant frequency and quality factor to be determined. After assembly of NFC chip with antenna, standard NFC Data Exchange Format (NDEF) plain text data was written to the tag with a Samsung Galaxy S5 model G900H (obtained from Samsung Electronics, South Korea) smartphone with application "NFC TagWriter by NXP" (obtained from NXP Semiconductors, Netherlands) The wheel was then scanned with a vector network analyzer (miniVNA PRO) and Samsung Galaxy S5 G900H phone (obtained from Samsung Electronics, South Korea) and the previously written data was successfully read and new data was able to be written as well.

Comparative Example A

A Type 27 depressed-center composite grinding wheel was prepared as follows. A 4.5-inch (11.4 cm) diameter disc of SCRIM1 was placed into a 4.5-inch diameter (11.4-cm) mold made of hardened steel. 75 grams of MIX1 was spread out evenly and a 4.5-inch (11.4-cm) disc of SCRIM3 was placed on top of the mix 1. The NFC circuit NFC2 was placed and centered inside the mold. A second 4.5-inch (11.4-cm) disc of SCRIM3 was placed on top of the NFC2. Another 75 grams of Mix 1 was spread out evenly on the third scrim. A 3-inch (7.6-cm) SCRIM2 disc was inserted and centered into the cavity. The filled cavity mold was then pressed at a pressure of 30 tons. The resulting wheel was removed from the cavity mold and placed on a spindle between depressed-center aluminum plates and pressed at 5 tons to give the wheel a Type 27 depressed-center shape. The wheel was then placed in an oven to cure for 7 hours at 79° C., 3 hours at 107° C., 18 hours at 185° C., and a temperature ramp-down over 4 hours to 27° C. The dimensions of the final grinding wheel were 114.3 mm diameter×6.35 mm thickness. The center hole was ⅞ inch (2.2 cm) in diameter.

The wheel was then scanned with the vector network analyzer (miniVNA PRO) described previously and phone as previously described but was unable to read/write data.

Comparative Example B

A Type 27 depressed-center composite grinding wheel was prepared as follows. A 4.5-inch (11.4 cm) diameter disc of SCRIM1 was placed into a 4.5-inch diameter (11.4-cm) mold made of hardened steel. 75 grams of MIX1 was spread out evenly and a 4.5-inch (11.4-cm) disc of SCRIM3 was placed on top of the mix 1. The NFC circuit NFC3 was placed and centered inside the mold. A second 4.5-inch (11.4-cm) disc of SCRIM3 was placed on top of the NFC3. Another 75 grams of Mix 1 was spread out evenly on the third scrim. A 3-inch (7.6-cm) SCRIM2 disc was inserted and centered into the cavity. The filled cavity mold was then pressed at a pressure of 30 tons. The resulting wheel was removed from the cavity mold and placed on a spindle between depressed-center aluminum plates and pressed at 5 tons to give the wheel a Type 27 depressed-center shape. The wheel was then placed in an oven to cure for 7 hours at 79° C., 3 hours at 107° C., 18 hours at 185° C., and a temperature ramp-down over 4 hours to 27° C. The dimensions of the final grinding wheel were 114.3 mm diameter×6.35 mm thickness. The center hole was ⅞ inch (2.2 cm) in diameter.

The wheel was then scanned with the vector network analyzer (miniVNA PRO) described previously and phone as previously described but was unable to read/write data.

What is claimed is:

1. A bonded abrasive wheel comprising:
   a plurality of abrasive particles disposed in a binder;
   a first grinding surface;
   an outer circumference;
   a rotational axis extending through a central hub; and
   a circuit configured for communication coupled to the bonded abrasive wheel, wherein the circuit comprises:
   a ring-shaped antenna with a radius of curvature embedded within the bonded abrasive wheel, the antenna comprising a mesh having a plurality of openings, each of the plurality of openings being defined between a plurality of strands of the mesh, and wherein, in cross-section, a total area of all of the plurality of openings is between 5 times and 20 times smaller than a central opening defined by the antenna having the radius of curvature; and
   an integrated circuit (IC) operably coupled to the antenna.

2. The abrasive wheel of claim 1, wherein the integrated circuit is encapsulated within a material having a modulus of greater than 0.25 MPa but less than 125 GPa.

3. The abrasive wheel claim 1, wherein the antenna comprises a single non-complete loop between a first end and a second end, and wherein both the antenna and the IC are positioned within the abrasive wheel so as to be spaced from the first grinding surface.

4. The abrasive wheel of claim 1, wherein the central hub is configured to receive a bushing, and wherein the bushing comprises one of:
   a non-metallic material; or the antenna.

* * * * *